US012583275B2

(12) United States Patent
Yamaguchi et al.

(10) Patent No.: US 12,583,275 B2
(45) Date of Patent: Mar. 24, 2026

(54) SHOCK ABSORBER

(71) Applicant: Hitachi Astemo, Ltd., Ibaraki (JP)

(72) Inventors: Yoshihiro Yamaguchi, Hitachinaka (JP); Sadatomo Matsumura, Hitachinaka (JP); Koichi Yamaka, Hitachinaka (JP); Naoya Tokoo, Hitachinaka (JP)

(73) Assignee: HITACHI ASTEMO, LTD., Ibaraki (JP)

( * ) Notice: Subject to any disclaimer, the term of this patent is extended or adjusted under 35 U.S.C. 154(b) by 404 days.

(21) Appl. No.: 18/023,826

(22) PCT Filed: Aug. 19, 2021

(86) PCT No.: PCT/JP2021/030392
§ 371 (c)(1),
(2) Date: Feb. 28, 2023

(87) PCT Pub. No.: WO2022/050065
PCT Pub. Date: Mar. 10, 2022

(65) Prior Publication Data
US 2023/0322035 A1 Oct. 12, 2023

(30) Foreign Application Priority Data
Sep. 4, 2020 (JP) ................................. 2020-149048

(51) Int. Cl.
*B60G 13/08* (2006.01)

(52) U.S. Cl.
CPC .......... *B60G 13/08* (2013.01); *B60G 2202/24* (2013.01); *B60G 2204/129* (2013.01); *B60G 2206/41* (2013.01); *B60G 2800/162* (2013.01)

(58) Field of Classification Search
CPC ................ B60G 13/08; B60G 2202/24; B60G 2204/129; B60G 2206/41; B60G 2800/162
(Continued)

(56) References Cited

U.S. PATENT DOCUMENTS

| | | | |
|---|---|---|---|
| 12,151,533 B2 * | 11/2024 | Nagao ........................ | F16F 9/54 |
| 2017/0254381 A1 * | 9/2017 | Chikamatsu ............ | F16F 9/366 |
| 2022/0112933 A1 * | 4/2022 | Yamaka ............... | B60G 13/005 |

FOREIGN PATENT DOCUMENTS

| | | |
|---|---|---|
| JP | 9-210113 W | 8/1997 |
| JP | 10-267014 | 10/1998 |

(Continued)

OTHER PUBLICATIONS

International Search Report received in corresponding International Application No. PCT/JP2021/030392 dated Oct. 12, 2021.
(Continued)

*Primary Examiner* — Christopher P Schwartz
(74) *Attorney, Agent, or Firm* — MATTINGLY & MALUR, PC

(57) ABSTRACT

This shock absorber includes an outer cylinder, and a bracket having a pair of extension parts. The outer cylinder has an opening and into which the inner cylinder is inserted and fixed. The pair of extension parts extend outward in a radial direction of the outer cylinder from different positions spaced apart in a circumferential direction of the outer cylinder. A hole portion and a reduced-rigidity part are provided in the pair of extension parts. The hole portion is provided at a position facing an attachment hole of an attachment member disposed between the pair of extension parts. The reduced-rigidity part is disposed at a disposition position on the outer cylinder side of the hole portion at the same position as the hole portion in the axial direction of the
(Continued)

outer cylinder. The reduced-rigidity part has a lower rigidity than a position different from the disposition position.

8 Claims, 18 Drawing Sheets

(58) Field of Classification Search
USPC ................................ 188/320, 321.11, 322.19
See application file for complete search history.

(56) References Cited

FOREIGN PATENT DOCUMENTS

JP          2000-27924  W      1/2000
JP          2019-210951  W     12/2019

OTHER PUBLICATIONS

Written Opinion received in corresponding International Application No. PCT/JP2021/030392 dated Oct. 12, 2021.

* cited by examiner

SHOCK ABSORBER

TECHNICAL FIELD

The present invention relates to a shock absorber.

Priority is claimed on Japanese Patent Application No. 2020-149048 filed on Sep. 4, 2020, the content of which is incorporated herein by reference.

BACKGROUND ART

A shock absorber having a weakened part provided at a position between two fastening holes for fastening a bracket to a knuckle is known (see, for example, Patent Document 1).

CITATION LIST

Patent Document

Patent Document 1

Japanese Unexamined Patent Application, First Publication No. 2000-27924

SUMMARY OF INVENTION

Technical Problem

Incidentally, improvement in efficiency of assembling a shock absorber to an attachment member has been demanded.

The present invention provides a shock absorber in which improvement in efficiency of assembly can be achieved.

Solution to Problem

According to a first aspect of the present invention, a shock absorber includes a bracket having a pair of extension parts. The pair of extension parts extend outward in a radial direction of an outer cylinder from different positions spaced apart in a circumferential direction of the outer cylinder. A hole portion and a reduced-rigidity part are provided in the pair of extension parts. The hole portion is provided at a position facing an attachment hole of an attachment member disposed between the pair of extension parts. The reduced-rigidity part is disposed at a disposition position on the outer cylinder side of the hole portion at the same position as the hole portion in the axial direction of the outer cylinder. The reduced-rigidity part has a lower rigidity than a position different from the disposition position.

According to a second aspect of the present invention, a shock absorber includes a bracket having a pair of extension parts. The pair of extension parts extend outward in a radial direction of the outer cylinder from different positions spaced apart in a circumferential direction of the outer cylinder. A hole portion is provided in the pair of extension parts at a position facing an attachment hole of an attachment member disposed between the pair of extension parts. A length in the circumferential direction of the outer cylinder between the pair of extension parts on an outer side of the hole portion in the radial direction of the outer cylinder is larger than a length in the circumferential direction of the outer cylinder between the pair of extension parts on the outer cylinder side of the hole portion.

Advantageous Effects of Invention

According to the shock absorber described above, improvement in efficiency of assembly can be achieved.

BRIEF DESCRIPTION OF DRAWINGS

FIG. 5 is a partial perspective view illustrating an outer cylinder member of a shock absorber according to a second embodiment of the present invention.

FIG. 9 is a partial perspective view illustrating an outer cylinder member of a shock absorber according to a fourth embodiment of the present invention.

DESCRIPTION OF EMBODIMENTS

First Embodiments

A shock absorber according to a first embodiment of the present invention will be described below with reference to FIGS. 1 to 4B.

Figure 1:
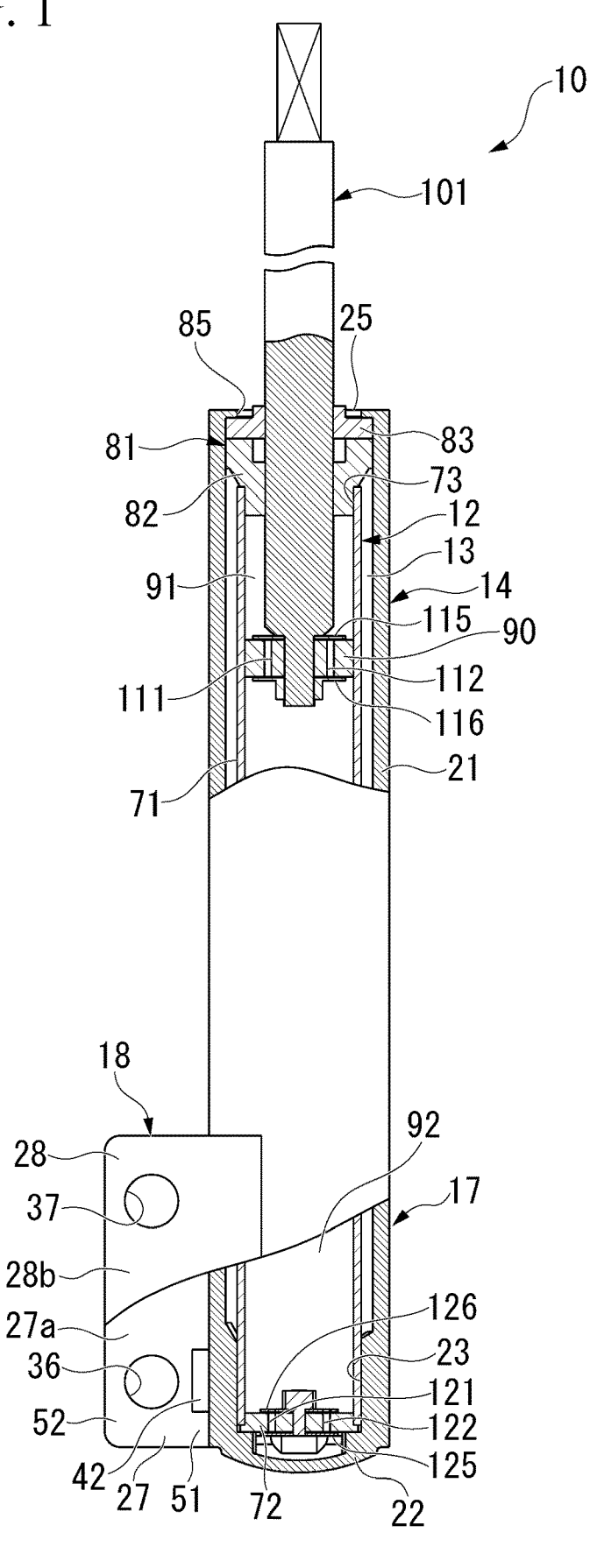
FIG. 1 is a front view including a partial cross section illustrating a shock absorber according to a first embodiment of the present invention.

FIG. 1 illustrates a shock absorber 10 of the first embodiment. The shock absorber 10 is a shock absorber used in a suspension device of a vehicle such as an automobile or a railway vehicle, and specifically, is a shock absorber used for a strut-type suspension of an automobile.

The shock absorber 10 includes a bottomed cylindrical inner cylinder member 12 and a bottomed cylindrical outer cylinder member 14. A working liquid is sealed in the inner cylinder member 12 as a working fluid. The outer cylinder member 14 has a larger diameter than the inner cylinder member 12. The outer cylinder member 14 is disposed close to an outer circumferential side of the inner cylinder member 12. The outer cylinder member 14 forms a reservoir chamber 13 between itself and the inner cylinder member 12. A working liquid and a working gas are sealed in the reservoir chamber 13 as a working fluid.

The outer cylinder member 14 is an integrally molded product that is formed integrally and seamlessly. The outer cylinder member 14 is formed of a metal that is shaped by heat and a force. Specifically, the outer cylinder member 14 is formed by casting an aluminum alloy. The outer cylinder member 14 includes a bottomed cylindrical outer cylinder 17 and a bracket 18 extending outward in a radial direction of the outer cylinder 17 from the outer cylinder 17.

The outer cylinder 17 includes a cylindrical side wall part 21, a bottom part 22, a protruding part 23, and an opening 25. The bottom part 22 closes one end side of the side wall part 21 in an axial direction. The protruding part 23 protrudes inward in the radial direction of the inner cylinder member 12 from the bottom part 22 side in the axial direction of an inner circumferential surface of the side wall part 21. The opening 25 is positioned on a side of the side wall part 21 opposite to the bottom part 22 in the axial direction. Therefore, the outer cylinder 17 has the opening 25 on one axial end side and the bottom part 22 on the other axial end side. A plurality of protruding parts 23 are intermittently formed at intervals in a circumferential direction of the outer cylinder 17.

Here, a direction in which a central axis of the outer cylinder 17 extends is referred to as an outer cylinder axial direction. A direction perpendicular to the central axis of the outer cylinder 17 is referred to as an outer cylinder radial direction. A circumferential direction centered on the central axis of the outer cylinder 17 is referred to as an outer cylinder circumferential direction. The opening 25 side of the outer cylinder 17 in the axial direction is referred to as a first end side in the outer cylinder axial direction. The bottom part 22 side of the outer cylinder 17 in the axial direction is referred to as a second end side in the outer cylinder axial direction.

Figure 2:
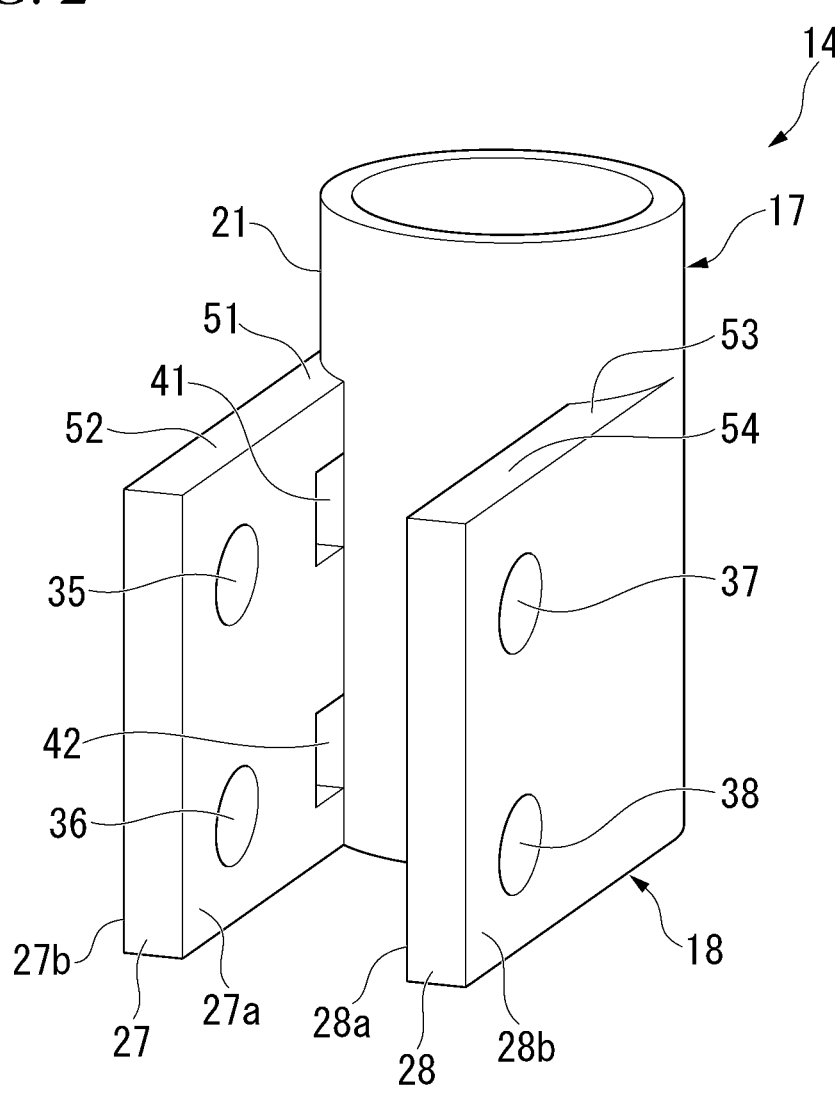
FIG. 2 is a partial perspective view illustrating an outer cylinder member of the shock absorber according to the first embodiment of the present invention.

As illustrated in FIG. 2, the bracket 18 includes a pair of plate-shaped extension parts 27 and 28. The pair of extension parts 27 and 28 extend outward in the outer cylinder radial direction of the outer cylinder 17 from different positions spaced apart in the outer cylinder circumferential direction of the outer cylinder 17. The pair of extension parts 27 and 28 are substantially parallel to each other. Both the pair of extension parts 27 and 28 extend in the outer cylinder axial direction and in the outer cylinder radial direction.

Figures 3A, 3B:
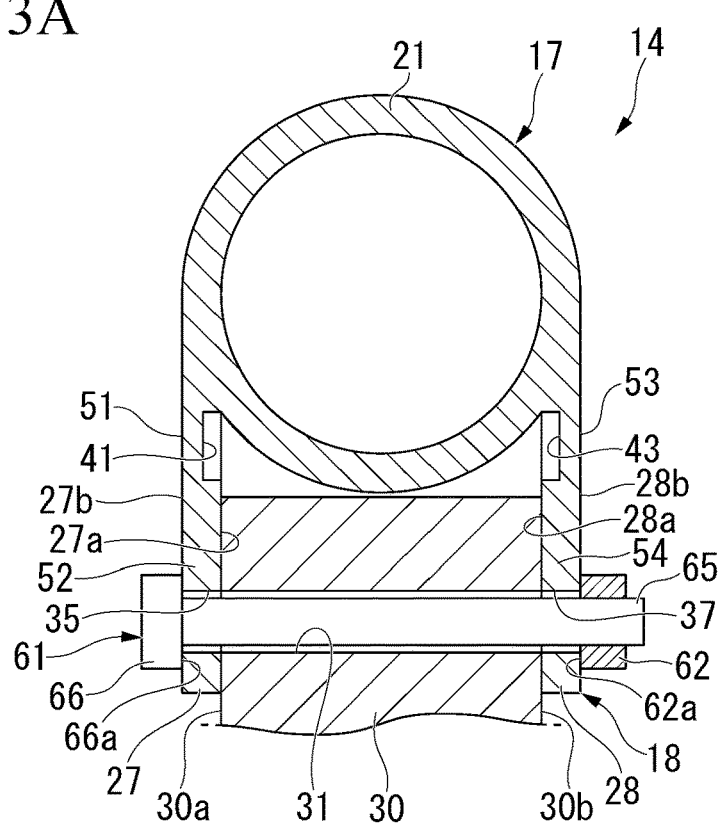
FIG. 3A is a transverse sectional view illustrating the outer cylinder member and the like of the shock absorber according to the first embodiment of the present invention.
FIG. 3B is a transverse sectional view illustrating the outer cylinder member and the like of the shock absorber according to the first embodiment of the present invention.

As illustrated in FIGS. 3A and 3B, a knuckle 30 (attachment member) is disposed between the pair of extension parts 27 and 28. In the extension part 27, a hole portion 35 is provided at a position facing an attachment hole 31 of the knuckle 30 (attachment member), and a hole portion 36 is provided at a position facing an attachment hole 32 of the knuckle 30. The knuckle 30 includes a pair of parallel outer surfaces 30a and 30b facing in opposite directions to each other. The attachment hole 31 and the attachment hole 32 penetrating perpendicular to the outer surfaces 30a and 30b to connect the outer surfaces 30a and 30b are formed in the knuckle 30. The attachment holes 31 and 32 are formed parallel to each other. As described above, the two attachment holes 31 and 32 are provided in the knuckle 30. The two hole portions 35 and 36 are also provided in the extension part 27. These hole portions 35 and 36 penetrate the extension part 27 in a plate thickness direction. As illustrated in FIG. 2, the hole portions 35 and 36 are provided to be spaced apart in the outer cylinder axial direction at the same position as each other in the outer cylinder radial direction. The hole portion 35 is disposed on the first end side in the outer cylinder axial direction with respect to the hole portion 36. These hole portions 35 and 36 have the same shape and are provided parallel to each other.

As illustrated in FIGS. 3A and 3B, also in the extension part 28, a hole portion 37 is provided at a position facing the attachment hole 31, and a hole portion 38 is provided at a position facing the attachment hole 32. Two hole portions 37 and 38 are also provided in the extension part 28 in this way. These hole portions 37 and 38 penetrate the extension part 28 in a plate thickness direction. As illustrated in FIG. 2, the hole portions 37 and 38 are provided to be spaced apart in the outer cylinder axial direction at the same position as each other in the outer cylinder radial direction. The hole portion 37 is disposed on the first end side in the outer cylinder axial direction with respect to the hole portion 38. These hole portions 37 and 38 have the same shape as the hole portions 35 and 36 and are provided parallel to each other.

The hole portion 35 of the extension part 27 and the hole portion 37 of the extension part 28 are disposed at the same position in the outer cylinder axial direction and disposed at the same position in the outer cylinder radial direction. Of the two hole portions 35 and 36 of the extension part 27, the hole portion 35 is a hole portion on the first end side in the outer cylinder axial direction. Of the two hole portions 37 and 38 of the extension part 28, the hole portion 37 is a hole portion on the first end side in the outer cylinder axial direction. The hole portions 35 and 37 on the first end side in the outer cylinder axial direction are formed on the same straight line.

The hole portion 36 of the extension part 27 and the hole portion 38 of the extension part 28 are disposed at the same position in the outer cylinder axial direction and disposed at the same position in the outer cylinder radial direction. Of the two hole portions 35 and 36 of the extension part 27, the hole portion 36 is a hole portion on the second end side in the outer cylinder axial direction. Of the two hole portions 37 and 38 of the extension part 28, the hole portion 38 is a hole portion on the second end side in the outer cylinder axial direction. The hole portions 36 and 38 on the second end side in the outer cylinder axial direction are formed on the same straight line.

The extension part 27 includes a rectangular recessed part 41 (reduced-rigidity part) formed at a predetermined disposition position on the outer cylinder 17 side of the hole portion 35 at the same position in the outer cylinder axial direction as the hole portion 35 on the first end side in the outer cylinder axial direction among the two hole portions 35 and 36. The extension part 27 has a facing surface 27a facing the extension part 28 and a non-facing surface 27b facing in a direction opposite to the extension part 28. The recessed part 41 is recessed toward the non-facing surface 27b side from the facing surface 27a of the extension part 27. In other words, the hole portion 35 and the recessed part 41 overlap each other in position in the outer cylinder axial direction. More specifically, positions of the hole portion 35 and the recessed part 41 coincide with each other in the outer cylinder axial direction. The recessed part 41 is formed on the facing surface 27a side of the extension part 27. A length of the recessed part 41 in the outer cylinder axial direction is equal to or larger than a length of the hole portion 35 in the outer cylinder axial direction.

The extension part 27 includes a recessed part 42 (reduced-rigidity part) having the same shape as the recessed part 41 and formed at a predetermined disposition position on the outer cylinder 17 side of the hole portion 36 at the same position in the outer cylinder axial direction as the hole portion 36 on the second end side in the outer cylinder axial direction among the two hole portions 35 and 36. The recessed part 42 is recessed toward the non-facing surface 27b side from the facing surface 27a of the extension part 27. In other words, the hole portion 36 and the recessed part 42 overlap each other in position in the outer cylinder axial direction. More specifically, positions of the hole portion 36 and the recessed part 42 coincide with each other in the outer cylinder axial direction. The recessed part 42 is formed on the facing surface 27a side of the extension part 27. A length of the recessed part 42 in the outer cylinder axial direction is equal to or larger than a length of the hole portion 36 in the outer cylinder axial direction.

These two recessed parts 41 and 42 are disposed at end portion positions of the facing surface 27a of the extension part 27 on the outer cylinder 17 side and are provided to be spaced apart in the outer cylinder axial direction at the same position as each other in the outer cylinder radial direction. The extension part 27 has a reduced thickness and lower rigidity at the disposition positions of the recessed parts 41 and 42 in the outer cylinder radial direction than at positions different from the disposition positions in the outer cylinder radial direction. The extension part 27 includes a base part 51 at an end edge on the outer cylinder 17 side at which the two recessed parts 41 and 42 are formed, and an adjacent part 52 adjacent to the base part 51 on an outer side in the outer cylinder radial direction. The base part 51 has a lower rigidity than the adjacent part 52. In other words, the extension part 27 has a lower bending rigidity at the base part 51 which is a boundary with an outer circumferential surface of the outer cylinder 17 and in which the two recessed parts 41 and 42 are formed than at the adjacent part 52 on an outer side of the base part 51 in the outer cylinder radial direction.

As illustrated in FIGS. 3A and 3B, the extension part 28 includes a rectangular recessed part 43 (reduced-rigidity part) formed at a predetermined disposition position on the outer cylinder 17 side of the hole portion 37 at the same position in the outer cylinder axial direction as the hole portion 37 on the first end side in the outer cylinder axial direction among the two hole portions 37 and 38. The extension part 28 has a facing surface 28a facing the extension part 27 and a non-facing surface 28b facing in a direction opposite to the extension part 27. The recessed part 43 is recessed toward the non-facing surface 28b side from the facing surface 28a of the extension part 28. In other words, the hole portion 37 and the recessed part 43 overlap each other in position in the outer cylinder axial direction. More specifically, positions of the hole portion 37 and the recessed part 43 coincide with each other in the outer cylinder axial direction. The recessed part 43 is formed on the facing surface 28a side of the extension part 28. The recessed part 43 coincides with the recessed part 41 in position in the outer cylinder axial direction and in the outer cylinder radial direction. The recessed part 43 has a mirror-symmetrical shape with respect to the recessed part 41. A length of the recessed part 43 in the outer cylinder axial direction is equal to or larger than a length of the hole portion 37 in the outer cylinder axial direction.

Also, the extension part 28 includes a recessed part 44 (reduced-rigidity part) having the same shape as the recessed part 43 and formed at a predetermined disposition position on the outer cylinder 17 side of the hole portion 38 at the same position in the outer cylinder axial direction as the hole portion 38 on the second end side in the outer cylinder axial direction among the two hole portions 37 and 38. The recessed part 44 is recessed toward the non-facing surface 28b side from the facing surface 28a of the extension part 28. In other words, the hole portion 38 and the recessed part 44 overlap each other in position in the outer cylinder axial direction. More specifically, positions of the hole portion 38 and the recessed part 44 coincide with each other in the outer cylinder axial direction. The recessed part 44 is formed on the facing surface 28a side of the extension part 28. The recessed part 44 coincides with the recessed part 42 in position in the outer cylinder axial direction and in the outer cylinder radial direction. The recessed part 44 has a mirror-symmetrical shape with respect to the recessed part 42. A length of the recessed part 44 in the outer cylinder axial direction is equal to or larger than a length of the hole portion 38 in the outer cylinder axial direction.

These two recessed parts 43 and 44 are disposed at end portion positions of the facing surface 28a of the extension part 28 on the outer cylinder 17 side and are provided to be spaced apart in the outer cylinder axial direction at the same position as each other in the outer cylinder radial direction. The extension part 28 has a reduced thickness and lower rigidity at the disposition positions of the recessed parts 43 and 44 in the outer cylinder radial direction than at positions different from the disposition positions in the outer cylinder radial direction. The extension part 28 includes a base part 53 at an end edge on the outer cylinder 17 side at which the two recessed parts 43 and 44 are formed, and an adjacent part 54 adjacent to the base part 53 on an outer side in the outer cylinder radial direction. The base part 53 has a lower rigidity than the adjacent part 54. In other words, the extension part 28 has a lower bending rigidity at the base part 53 which is a boundary with an outer circumferential surface of the outer cylinder 17 and in which the two recessed parts 43 and 44 are formed than at the adjacent part 54 on an outer side of the base part 53 in the outer cylinder radial direction.

In the bracket 18 in a natural state before being assembled to the knuckle 30, the facing surface 27a and the facing surface 28a of the extension part 27 and the extension part 28 are slightly open so that a distance therebetween increases outward in the outer cylinder radial direction. This is to improve an efficiency of assembly to the knuckle 30. The facing surface 27a and the facing surface 28a are symmetrically inclined.

In the shock absorber 10, the bracket 18 is connected to the knuckle 30 on the wheel side by a bolt 61 and a nut 62 screwed onto the bolt 61, and a bolt 63 and a nut 64 screwed onto the bolt 63. The bolt 61 is inserted into the two hole portions 35 and 37 on the first end side in the outer cylinder axial direction. The bolt 63 is inserted into the two hole portions 36 and 38 on the second end side in the outer cylinder axial direction.

At this time, a screw shaft part 65 of the bolt 61 is inserted through the hole portion 35 of the extension part 27, the attachment hole 31 of the knuckle 30, and the hole portion 37 of the extension part 28. At this time, a seat surface 66a of a head part 66 on the screw shaft part 65 side faces the non-facing surface 27b of the extension part 27. At that time, the nut 62 is screwed onto a portion of the screw shaft part 65 of the bolt 61 protruding from the non-facing surface 28b of the extension part 28. At this time, a seat surface 62a facing the head part 66 side faces the non-facing surface 28b of the extension part 28.

A screw shaft part 67 of the bolt 63 is inserted through the hole portion 36 of the extension part 27, the attachment hole 32 of the knuckle 30, and the hole portion 38 of the extension part 28. At this time, a seat surface 68a of a head part 68 on the screw shaft part 67 side faces the non-facing surface 27b of the extension part 27. The nut 64 is screwed onto a portion of the screw shaft part 67 of the bolt 63 protruding from the non-facing surface 28b of the extension part 28. At this time, a seat surface 64a facing the head part 68 side faces the non-facing surface 28b of the extension part 28.

In this state, the bolt 61 and nut 62 are fastened, and the bolt 63 and nut 64 are fastened. Then, the seat surfaces 66a and 68a of the head parts 66 and 68 of the bolts 61 and 63 are in contact with the non-facing surface 27b of the extension part 27 by surface contact, and the seat surfaces 62a and 64a of the nuts 62 and 64 are in contact with the non-facing surface 28b of the extension part 28 by surface contact. In addition, the facing surface 27a of the extension part 27 is in contact with the outer surface 30a of the knuckle 30 by surface contact, and the facing surface 28a of the extension part 28 is in contact with the outer surface 30b of the knuckle 30 by surface contact. At this time, the extension parts 27 and 28 have a lower bending rigidity at the base parts 51 and 53. Therefore, the base parts 51 and 53 are mainly deformed, and the extension parts 27 and 28 are relatively easily deformed, thereby facilitating the surface contact of the parts.

As illustrated in FIG. 1, the inner cylinder member 12 is in contact with the bottom part 22 of the outer cylinder member 14. The inner cylinder member 12 includes a cylindrical inner cylinder 71 made of a metal, and a body 72 made of a metal provided in the inner cylinder 71 to close the other end side thereof in the axial direction. An opening 73 is formed on a side of the inner cylinder 71 opposite to the body 72. An outer circumferential portion of the body 72 has a stepped shape including a small-diameter portion and a large-diameter portion having a diameter larger than that of the small-diameter portion. An end portion of the inner cylinder 71 on the second end side in the outer cylinder axial direction is fitted to the small-diameter portion of the body 72.

The shock absorber 10 includes a close member 81 that closes the opening 73 of the inner cylinder member 12 and the opening 25 of the outer cylinder member 14. The close member 81 is constituted by an annular rod guide 82 and an annular seal member 83. The rod guide 82 is fitted to both the side wall part 21 of the outer cylinder 17 and the inner cylinder 71. The seal member 83 is disposed on a side opposite to the bottom part 22 with respect to the rod 82 and is fitted to the side wall part 21 of the outer cylinder 17.

An outer circumferential portion of the rod guide 82 has a stepped shape including a small-diameter portion and a large-diameter portion having a diameter larger than that of the small-diameter portion. The body 72 side of the inner cylinder 71 is fitted inside the plurality of protruding parts 23 of the outer cylinder member 14. The body 72 is in contact with the bottom part 22 of the outer cylinder member 14. The opening 73 of the inner cylinder member 12 is fitted to the small diameter portion of the outer circumferential portion of the rod guide 82. The rod guide 82 is fitted to the opening 25 side of the side wall part 21 of the outer cylinder member 14 at the large diameter portion of the outer circumferential portion. Thereby, the inner cylinder member 12 is supported by the outer cylinder member 14 via the rod guide 82. In this state, the inner cylinder member 12 is disposed coaxially with the outer cylinder member 14 and positioned not to move in the radial direction.

The outer cylinder member 14 includes a swaged part 85 that is plastically deformed inward in the radial direction by curling processing at an end portion of the side wall part 21 on a side opposite to the bottom part 22. The body 72 of the inner cylinder member 12 is in contact with the bottom part 22 of the outer cylinder member 14. Thereby, the rod guide 82 fitted to the inner cylinder member 12 is axially positioned with respect to the outer cylinder member 14. The seal member 83 is sandwiched between the rod guide 82 axially positioned with respect to the outer cylinder member 14 as described above and the swaged part 85 of the outer cylinder member 14. The seal member 83 seals the opening 25 side of the outer cylinder member 14. The inner cylinder 71 is inserted and fixed inside the outer cylinder 17.

The shock absorber 10 includes a piston 90 (relative movement member) provided in the inner cylinder 71 of the inner cylinder member 12. The piston 90 is inserted inside the inner cylinder 71 from the opening 73 at one end of the inner cylinder 71 in the axial direction. The piston 90 is fitted in the inner cylinder 71 to be slidable and moves relative to the inner cylinder 71 in the axial direction. The piston 90 defines a first chamber 91 and a second chamber 92 in the inner cylinder member 12. The first chamber 91 is provided between the piston 90 and the rod guide 82 in the inner cylinder member 12, and the second chamber 92 is provided between the piston 90 and the body 72 in the inner cylinder member 12. The second chamber 92 in the inner cylinder member 12 is divided from the reservoir chamber 13 by the body 72. The first chamber 91 and the second chamber 92 are filled with an oil fluid serving as a working liquid. The reservoir chamber 13 is filled with a gas serving as a working gas and the oil fluid serving as a working liquid.

The shock absorber 10 includes a rod 101 (relative movement member). One end side of the rod 101 in the axial direction is disposed in the inner cylinder 71 to be connected to the piston 90. The other end side of the rod 101 in the axial direction extends to the outside from the inner cylinder 71 and the outer cylinder 17 through the openings 73 and 25. The rod 101 is inserted into the inner cylinder 71 through the opening 73 at one end of the inner cylinder 71 in the axial direction to be connected to the piston 90. The rod 101 moves relative to the inner cylinder 71 in the axial direction together with the piston 90. The rod 101 extends to the outside from the inner cylinder member 12 and the outer cylinder member 14 through the rod guide 82 and the seal member 83. Radial movement of the rod 101 is restricted by the rod guide 82, and the rod 101 moves integrally with the piston 90 in the axial direction with respect to the inner cylinder member 12 and the outer cylinder member 14. The seal member 83 closes a space between the outer cylinder member 14 and the rod 101, thereby restricting leakage of the working liquid in the inner cylinder member 12 and the working gas and the working liquid in the reservoir chamber 13 to the outside. The rod 101 of the shock absorber 10 is connected to the vehicle body side.

The piston 90 has a passage 111 and a passage 112 formed to penetrate in the axial direction. The passage 111 and the passage 112 allow the first chamber 91 and the second chamber 92 to communicate with each other. The shock absorber 10 includes an annular disc valve 115 on a side of the piston 90 opposite to the bottom part 22 in the axial direction. The disc valve 115 can close the passage 111 by coming into contact with the piston 90. Also, the shock absorber 10 includes an annular disc valve 116 on the bottom part 22 side of the piston 90 in the axial direction. The disc valve 116 can close the passage 112 by coming into contact with the piston 90.

When the rod 101 moves to a compression side that increases an amount of entry into the inner cylinder 71 and the outer cylinder 17, the piston 90 moves in a direction in which the second chamber 92 is reduced. Then, when a pressure in the second chamber 92 becomes higher than a pressure in the first chamber 91 by a predetermined value or higher, the disc valve 115 opens the passage 111. At that time, the disc valve 115 generates a damping force. When the rod 101 moves to an extension side that increases an amount of protrusion from the inner cylinder 71 and the outer cylinder 17, the piston 90 moves in a direction in which the first chamber 91 is reduced. Then, when a pressure in the first chamber 91 becomes higher than a pressure in the second chamber 92 by a predetermined value or higher, the disc valve 116 opens the passage 112. At that time, the disc valve 116 generates a damping force. Therefore, the rod 101 and the piston 90 generate a damping force by moving relative to the inner cylinder 71 in the axial direction.

The body 72 of the inner cylinder member 12 includes a passage 121 and a passage 122 formed to penetrate in the axial direction. The passage 121 and the passage 122 allow the second chamber 92 and the reservoir chamber 13 to communicate with each other. The shock absorber 10 includes an annular disc valve 125 and an annular disc valve 126. The disc valve 125 is positioned on the bottom part 22 side of the body 72 in the axial direction. The disc valve 125 can close the passage 121 by coming into contact with the body 72. The disc valve 126 is positioned on a side of the body 72 opposite to the bottom part 22 in the axial direction. The disc valve 126 can close the passage 122 by coming into contact with the body 72.

When the rod 101 moves to the compression side, the piston 90 moves in a direction in which the second chamber 92 is reduced. Then, when a pressure in the second chamber 92 becomes higher than a pressure in the reservoir chamber 13 by a predetermined value or higher, the disc valve 125 opens the passage 121. At that time, the disc valve 125 generates a damping force. When the rod 101 moves to the extension side, the piston 90 moves to the first chamber 91 side. Then, when a pressure in the second chamber 92 becomes lower than a pressure in the reservoir chamber 13, the disc valve 126 opens the passage 122. At that time, the disc valve 126 allows the working fluid to flow from the reservoir chamber 13 into the second chamber 92 without substantially generating a damping force. That is, the disc valve 126 serves as a suction valve.

Patent Document 1 described above describes a shock absorber in which a weakened part is provided at a position between two fastening holes for fastening a bracket to a knuckle. When the bracket of the shock absorber is changed from an iron-based material to an aluminum-based material for weight reduction, even if a wall thickness is increased to make up for a lack of strength, bending of the bracket can be promoted by providing the weakened part. Therefore, even if a fastening axial force of the bolt and nut is set to be small, a surface pressure of a seat surface of the bolt and nut can be secured, and stability of fastening can be enhanced. Thereby, improvement in efficiency of assembling the shock absorber to the knuckle is achieved. However, in a configuration in which the weakened part is provided at a position between the two fastening holes, there is a likelihood that an effect of securing a surface pressure of the seat surface of the bolt and nut while setting the fastening axial force of the bolt and nut to be small will not be sufficient. In this case, a base side of the bracket may not be able to receive the axial force sufficiently.

On the other hand, reducing rigidity of a portion of the base of the bracket protruding from the outer surface of the cylinder (boundary portion between the cylinder side surface and the bracket portion) at the same position in the cylinder axial direction as the hole portion for fastening to the attachment member is effective to secure a surface pressure of the seat surface of the bolt and nut. Therefore, in the bracket 18 of the shock absorber 10 of the first embodiment, the hole portions 35 and 37 and the recessed parts 41 and 43 are provided in the pair of extension parts 27 and 28. The hole portions 35 and 37 face the attachment hole 31 of the knuckle 30 disposed between the pair of extension parts 27 and 28. The recessed parts 41 and 43 are disposed at the disposition positions on the outer cylinder 17 side of the hole portions 35 and 37 at the same positions in the outer cylinder axial direction as the hole portions 35 and 37. The recessed parts 41 and 43 have a lower rigidity than positions different from the disposition positions. Also, in the bracket 18, the hole portions 36 and 38 and the recessed parts 42 and 44 are provided in the pair of extension parts 27 and 28. The hole portions 36 and 38 face the attachment hole 32 of the knuckle 30 disposed between the pair of extension parts 27 and 28. The recessed parts 42 and 44 are disposed at the disposition positions on the outer cylinder 17 side of the hole portions 36 and 38 at the same positions as the hole portions 36 and 38 in the outer cylinder axial direction. The recessed parts 42 and 44 have a lower rigidity than positions different from the disposition positions. Thereby, bending of the bracket 18 can be further promoted. Therefore, even if fastening axial forces of the bolts 61 and 63 and the nuts 62 and 64 are set to be small, surface pressures of the seat surfaces 66*a*, 68*a*, 62*a*, and 64*a* of the bolts 61 and 63 and the nuts 62 and 64 can be secured, and stability of fastening can be further enhanced. Thereby, since the fastening axial forces of the bolts 61 and 63 and the nuts 62 and 64 can be set to be small, further improvement in efficiency of assembling the shock absorber 10 to the knuckle 30 can be achieved.

Also, in the shock absorber 10 of the first embodiment, the recessed parts 41 to 44 are formed on the outer cylinder 17 side of the hole portions 35 to 38 whose contributions to product strengths of the pair of extension parts 27 and 28 are low. Therefore, further improvement in efficiency of assembling the shock absorber 10 to the knuckle 30 can be achieved while satisfying product strengths of the pair of extension parts 27 and 28.

Also, the shock absorber 10 of the first embodiment has a structure in which the pair of extension parts 27 and 28 include the recessed parts 41 and 43 provided at the disposition positions on the outer cylinder 17 side of the hole portions 35 and 37 at the same positions in the outer cylinder axial direction as the hole portions 35 and 37. Then, the shock absorber 10 has a structure in which the pair of extension parts 27 and 28 include the recessed parts 42 and 44 provided at the disposition positions on the outer cylinder 17 side of the hole portions 36 and 38 at the same positions in the outer cylinder axial direction as the hole portions 36 and 38. Therefore, a change in fastening conditions of the bolts 61 and 63 and the nuts 62 and 64, and a change in knuckle 30 as the mating part are not necessary. Also, even if a hose bracket or a harness bracket is attached to the outer cylinder 17, interference therewith can be prevented.

Further, since the shock absorber 10 of the first embodiment has a structure in which the recessed parts 41 to 44 are provided in the pair of extension parts 27 and 28, weight reduction can be achieved.

Also, in the shock absorber 10 of the first embodiment, the recessed parts 41 to 44 are formed on the facing surfaces 27*a* and 28*a* side on an inner side of the pair of extension parts 27 and 28. Therefore, compared to a case in which the recessed parts 41 to 44 are formed on the non-facing surfaces 27*b* and 28*b* side on an outer side, it is possible to suppress an increase in stress generated when a bending load is applied.

Also, in the shock absorber 10 of the first embodiment, the outer cylinder 17 and the pair of extension parts 27 and 28 are integrally formed of a metal that is shaped by heat and a force. Therefore, manufacturing is facilitated.

Also, in the bracket 18 of the first embodiment, it is possible to form, for example, only the recessed parts 41 and 43 or only the recessed parts 42 and 44 among the recessed parts 41 to 44. That is, at least one of the recessed parts 41 to 44 may be formed.

Figure 4A:
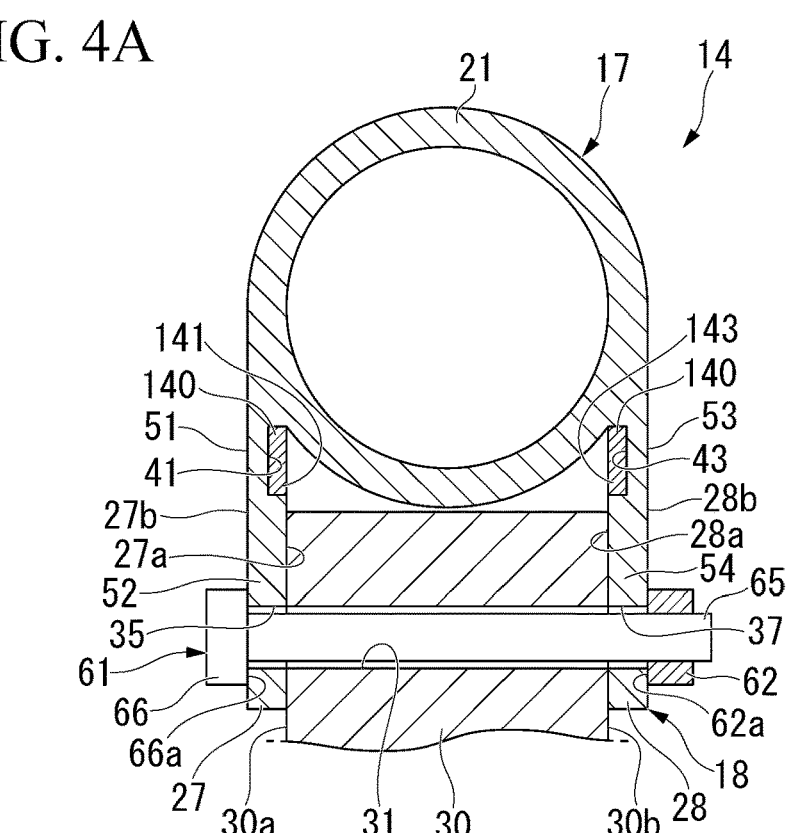
FIG. 4A is a transverse sectional view illustrating a modified example of the outer cylinder member and the like of the shock absorber according to the first embodiment of the present invention.
Figure 4B:
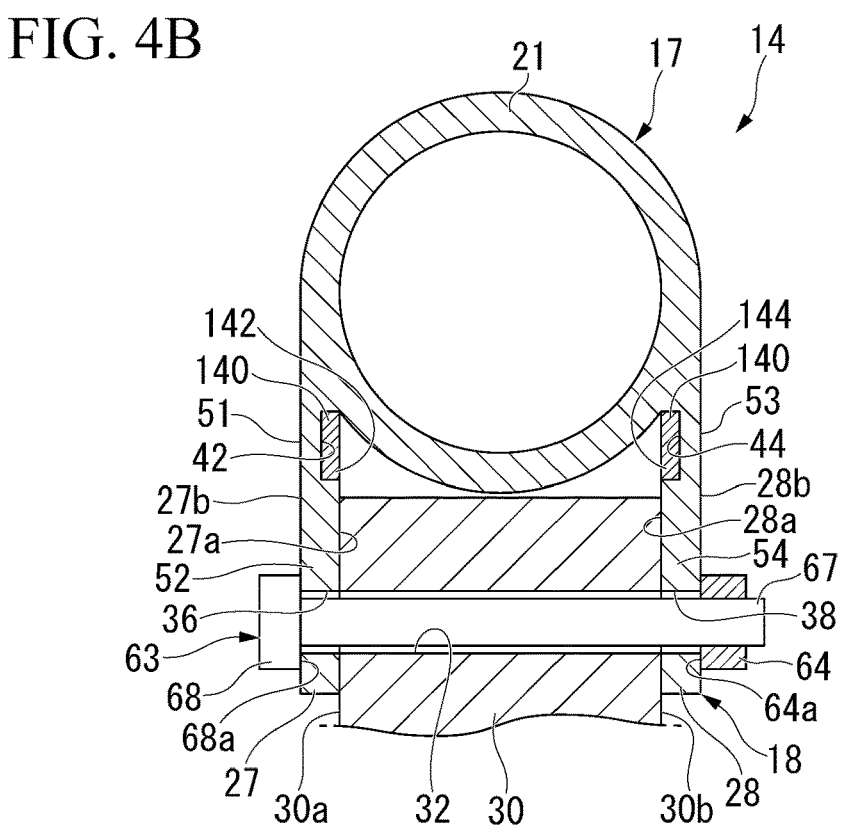
FIG. 4B is a transverse sectional view illustrating a modified example of the outer cylinder member and the like of the shock absorber according to the first embodiment of the present invention.

Also, as a modified example of the bracket 18 of the first embodiment, at least one of the recessed parts 41 to 44 may be entirely or partially filled with a low-rigidity material having a rigidity lower than that of the outer cylinder member 14 including the pair of extension parts 27 and 28. As illustrated in FIGS. 4A and 4B, it is possible to configure such that, for example, the entire recessed parts 41 and 42 are filled with a low-rigidity material 140 to form reduced-rigidity parts 141 and 142, and the entire recessed parts 43 and 44 are filled with the low-rigidity material 140 to form reduced-rigidity parts 143 and 144. In this case, the recessed parts 41 and 42 may be coplanar with the facing surface 27*a*. The recessed parts 43 and 44 may be coplanar with the facing surface 28*a*.

Second Embodiment

Next, a second embodiment will be described mainly on the basis of FIG. 5, FIG. 6A, and FIG. 6B, focusing on differences from the first embodiment. Also, parts common to those in the first embodiment will be denoted by the same terms and the same reference signs.

Figure 5:
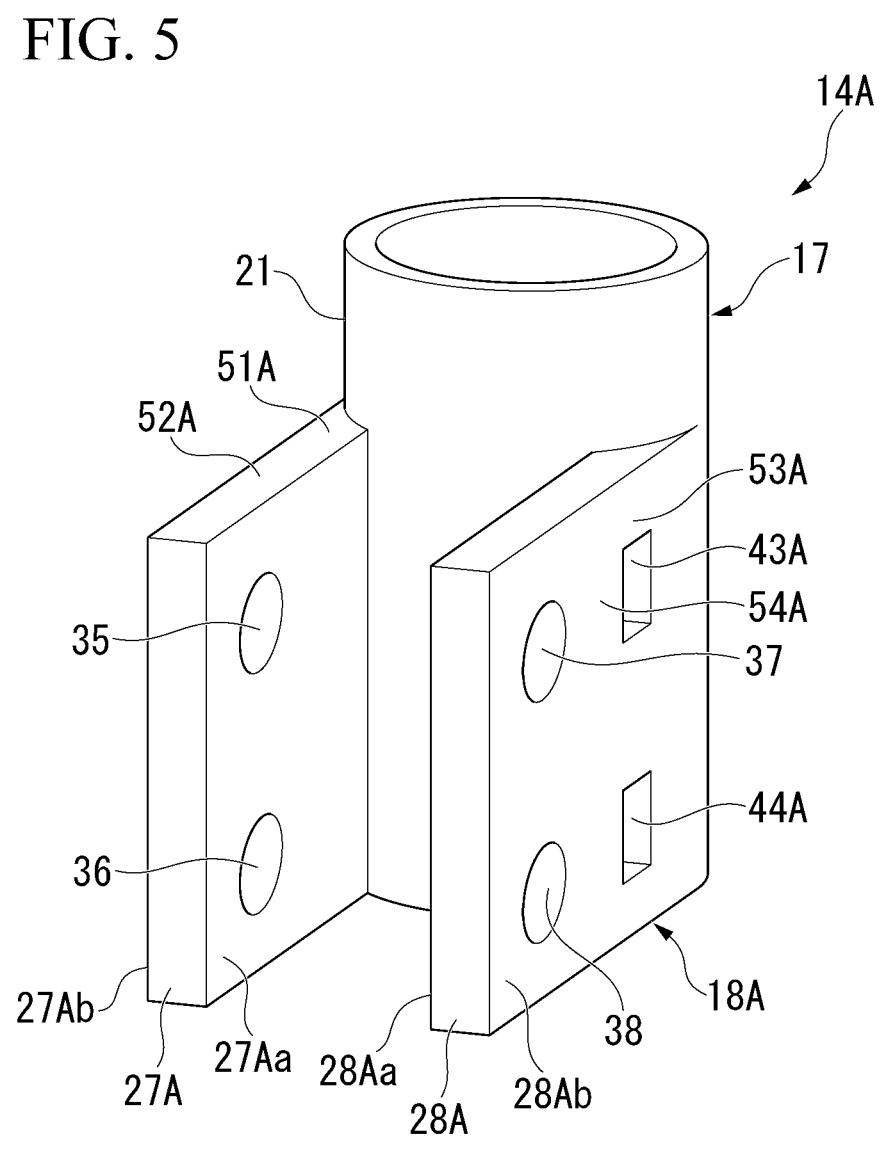

As illustrated in FIG. 5, in the second embodiment, an outer cylinder member 14A is used instead of the outer cylinder member 14 of the first embodiment. The outer cylinder member 14A includes a bracket 18A. The bracket 18A includes an extension part 27A and an extension part 28A.

Hole portions 35 and 36 similar to those of the extension part 27 in the first embodiment are provided in the extension part 27A, and hole portions 37 and 38 similar to those of the extension part 28 in the first embodiment are also provided in the extension part 28A.

Figure 6A:
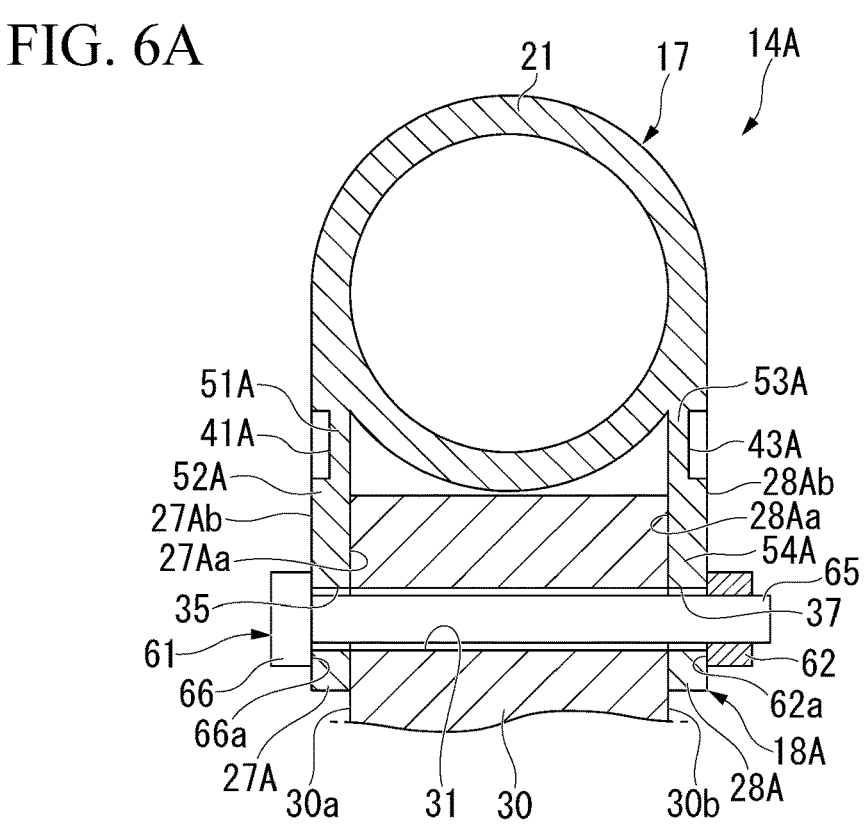
FIG. 6A is a transverse sectional view illustrating the outer cylinder member and the like of the shock absorber according to the second embodiment of the present invention.
Figure 6B:
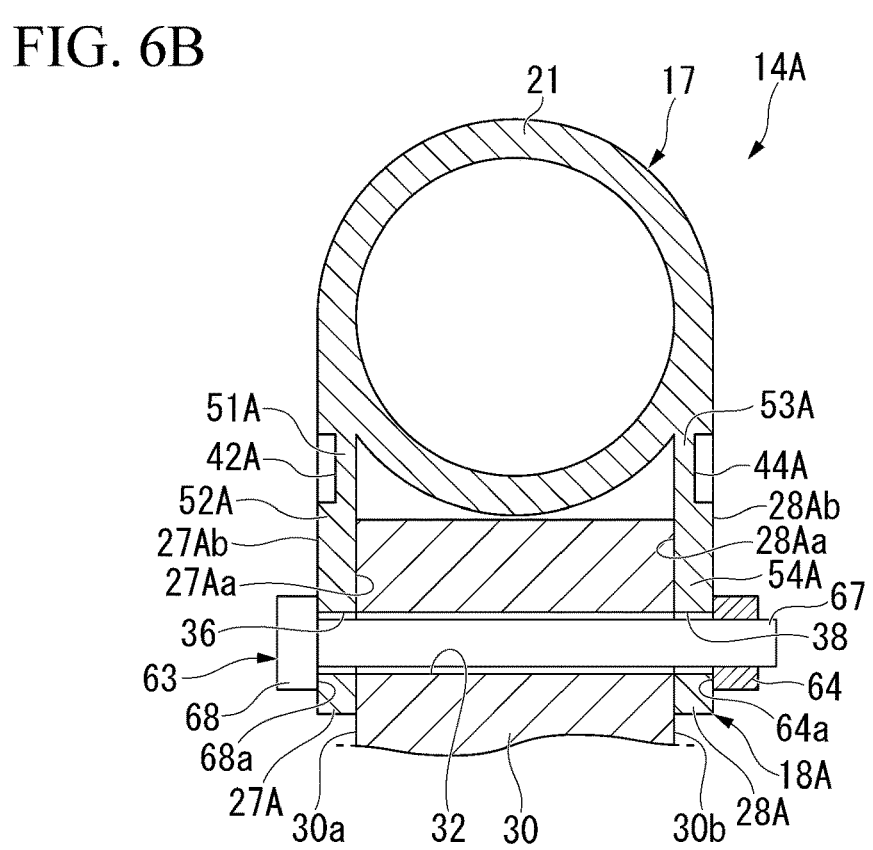
FIG. 6B is a transverse sectional view illustrating the outer cylinder member and the like of the shock absorber according to the second embodiment of the present invention.

As illustrated in FIGS. 6A and 6B, the extension part 27A includes a recessed part 41A (reduced-rigidity part) formed at a predetermined disposition position on an outer cylinder 17 side of the hole portion 35 at the same position in an outer cylinder axial direction as the hole portion 35. The extension part 27A has a facing surface 27Aa facing the extension part 28A and a non-facing surface 27Ab facing in a direction opposite to the extension part 28A. The recessed part 41A is recessed toward the facing surface 27Aa side from the non-facing surface 27Ab of the extension part 27A. In other words, the hole portion 35 and the recessed part 41A overlap each other in position in the outer cylinder axial direction. More specifically, positions of the hole portion 35 and the recessed part 41A coincide with each other in the outer cylinder axial direction. The recessed part 41A is formed on the non-facing surface 27Ab side of the extension part 27A. A length of the recessed part 41A in the outer cylinder axial direction is equal to or larger than a length of the hole portion 35 in the outer cylinder axial direction.

Also, the extension part 27A includes a recessed part 42A (reduced-rigidity part) having the same shape as the recessed part 41A and formed at a predetermined disposition position on the outer cylinder 17 side of the hole portion 36 at the same position in the outer cylinder axial direction as the hole portion 36. The recessed part 42A is recessed toward the facing surface 27Aa side from the non-facing surface 27Ab of the extension part 27A. In other words, the hole portion 36 and the recessed part 42A overlap each other in position in the outer cylinder axial direction. More specifically, positions of the hole portion 36 and the recessed part 42A coincide with each other in the outer cylinder axial direction. The recessed part 42A is also formed on the non-facing surface 27Ab side of the extension part 27A. A length of the recessed part 42A in the outer cylinder axial direction is equal to or larger than a length of the hole portion 36 in the outer cylinder axial direction.

These two recessed parts 41A and 42A are disposed at end portion positions of the extension part 27A on the outer cylinder 17 side and are provided to be spaced apart in the outer cylinder axial direction at the same position as each other in an outer cylinder radial direction. The extension part 27A has a reduced thickness and lower rigidity at the disposition positions of the recessed parts 41A and 42A in the outer cylinder radial direction than at positions different from the disposition positions in the outer cylinder radial direction. The extension part 27A includes a base part 51A on the outer cylinder 17 side at which the two recessed parts 41A and 42A are formed, and an adjacent part 52A adjacent to the base part 51A on an outer side in the outer cylinder radial direction. The base part 51A has a lower rigidity than the adjacent part 52A.

The extension part 28A includes a recessed part 43A (reduced-rigidity part) formed at a predetermined disposition position on the outer cylinder 17 side of the hole portion 37 at the same position in the outer cylinder axial direction as the hole portion 37. The extension part 28A has a facing surface 28Aa facing the extension part 27A and a non-facing surface 28Ab facing in a direction opposite to the extension part 27A. The recessed part 43 is recessed toward the facing surface 28Aa side from the non-facing surface 28Ab of the extension part 28. In other words, the hole portion 37 and the recessed part 43A overlap each other in position in the outer cylinder axial direction. More specifically, positions of the hole portion 37 and the recessed part 43A coincide with each other in the outer cylinder axial direction. The recessed part 43A is formed on the non-facing surface 28Ab side of the extension part 28A. The recessed part 43A coincides with the recessed part 41A in position in the outer cylinder axial direction and in the outer cylinder radial direction. The recessed part 43A has a mirror-symmetrical shape with respect to the recessed part 41A. A length of the recessed part 43A in the outer cylinder axial direction is equal to or larger than a length of the hole portion 37 in the outer cylinder axial direction.

The extension part 28A includes a recessed part 44A (reduced-rigidity part) having the same shape as the recessed part 43A and formed at a predetermined disposition position on the outer cylinder 17 side of the hole portion 38 at the same position in the outer cylinder axial direction as the hole portion 38. The recessed part 44A is recessed toward the facing surface 28Aa side from the non-facing surface 28Ab of the extension part 28A. In other words, the hole portion 38 and the recessed part 44A overlap each other in position in the outer cylinder axial direction. More specifically, positions of the hole portion 38 and the recessed part 44A coincide with each other in the outer cylinder axial direction. The recessed part 44A is also formed on the non-facing surface 28Ab side of the extension part 28A. The recessed part 44A coincides with the recessed part 42A in position in the outer cylinder axial direction and in the outer cylinder radial direction. The recessed part 44A has a mirror-symmetrical shape with respect to the recessed part 42A. A length of the recessed part 44A in the outer cylinder axial direction is equal to or larger than a length of the hole portion 38 in the outer cylinder axial direction.

These two recessed parts 43A and 44A are disposed at end portion positions of the extension part 28A on the outer cylinder 17 side and are provided to be spaced apart in the outer cylinder axial direction at the same position as each other in the outer cylinder radial direction. The extension part 28A has a reduced thickness and lower rigidity at the disposition positions of the recessed parts 43A and 44A in the outer cylinder radial direction than at positions different from the disposition positions in the outer cylinder radial direction. The extension part 28A includes a base part 53A on the outer cylinder 17 side at which the two recessed parts 43A and 44A are formed, and an adjacent part 54A adjacent to the base part 53A on an outer side in the outer cylinder radial direction. The base part 53A has a lower rigidity than the adjacent part 54A.

Similarly to the bracket 18 of the first embodiment, the bracket 18A is connected to a knuckle 30 on a wheel side by a bolt 61 and a nut 62 screwed onto the bolt 61, and a bolt 63 and a nut 64 screwed onto the bolt 63. The bolt 61 is inserted into the two hole portions 35 and 37 on a first end side in the outer cylinder axial direction. The bolt 63 is inserted into the two hole portions 36 and 38 on a second end side in the outer cylinder axial direction. At this time, the extension parts 27A and 28A have a lower bending rigidity at the base parts 51A and 53A. Therefore, the base parts 51A and 53A are mainly deformed, and the extension parts 27A and 28A are relatively easily deformed as in the extension parts 27 and 28 of the first embodiment.

In the bracket 18A of the second embodiment, the recessed parts 41A and 43A are provided in the pair of extension parts 27A and 28A. The recessed parts 41A and 43A are disposed at the disposition positions on the outer cylinder 17 side of the hole portions 35 and 37 at the same positions in the outer cylinder axial direction as the hole portions 35 and 37. The recessed parts 41A and 43A have a lower rigidity than positions different from the disposition positions. Also, the recessed parts 42A and 44A are provided in the pair of extension parts 27A and 28A. The recessed parts 42A and 44A are disposed at the disposition positions on the outer cylinder 17 side of the hole portions 36 and 38 at the same positions as the hole portions 36 and 38 in the outer cylinder axial direction. The recessed parts 42A and 44A have a lower rigidity than positions different from the disposition positions. Thereby, bending of the bracket 18B can be further promoted. Therefore, even if fastening axial forces of the bolts 61 and 63 and the nuts 62 and 64 are set to be small, surface pressures of seat surfaces 66a, 68a, 62a, and 64a of the bolts 61 and 63 and the nuts 62 and 64 can be secured, and stability of the fastening can be further enhanced. Thereby, further improvement in efficiency of assembling the bracket 18A to the knuckle 30 can be achieved.

Further, in the bracket 18A of the second embodiment, of the recessed parts 41A to 44A, for example, only the recessed parts 41A and 43A can be formed or only the recessed parts 42A and 44A can be formed. That is, at least one of the recessed parts 41A to 44A may be formed.

Also, in the bracket 18A of the second embodiment, as in the modified example described in the first embodiment, at least one of the recessed parts 41A to 44A may be entirely or partially filled with a low-rigidity material having a rigidity lower than that of the outer cylinder member 14A including the pair of extension parts 27A and 28A. It is possible to configure such that, for example, the entire recessed parts 41A and 42A are filled with a low-rigidity material to form reduced-rigidity parts, and the entire recessed parts 43A and 44A are filled with the low-rigidity material to form reduced-rigidity parts. In this case, the recessed parts 41A and 42A may be coplanar with the non-facing surface 27Ab. The recessed parts 43A and 44A may be coplanar with the non-facing surface 28Ab.

Third Embodiment

Next, a third embodiment will be described mainly on the basis of FIG. 7, FIG. 8A, and FIG. 8B, focusing on differences from the first embodiment. Also, parts common to those in the first embodiment will be denoted by the same terms and the same reference signs.

Figure 7:
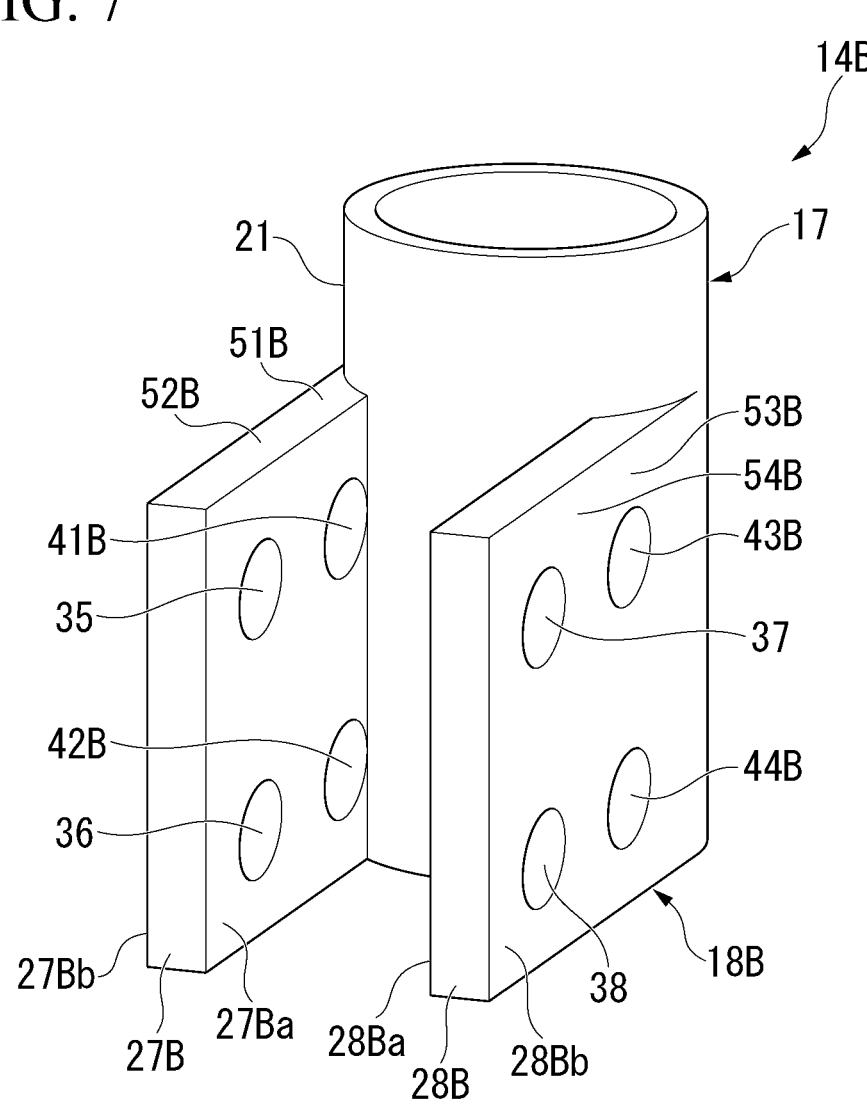
FIG. 7 is a partial perspective view illustrating an outer cylinder member of a shock absorber according to a third embodiment of the present invention.

As illustrated in FIG. 7, in the third embodiment, an outer cylinder member 14B is used instead of the outer cylinder member 14 of the first embodiment. The outer cylinder member 14B includes a bracket 18B. The bracket 18B includes an extension part 27B and an extension part 28B.

Hole portions 35 and 36 similar to those of the extension part 27 in the first embodiment are provided in the extension part 27B, and hole portions 37 and 38 similar to those of the extension part 28 in the first embodiment are also provided in the extension part 28B.

The extension part 27B includes a through hole 41B (reduced-rigidity part) formed at a predetermined disposition position on an outer cylinder 17 side of the hole portion 35 at the same position in an outer cylinder axial direction as the hole portion 35. The extension part 27B has a facing surface 27Ba facing the extension part 28B and a non-facing surface 27Bb facing in a direction opposite to the extension part 28B. The through hole 41B penetrates from the facing surface 27Ba to the non-facing surface 27Bb of the extension part 27B. In other words, the hole portion 35 and the through hole 41B overlap each other in position in the outer cylinder axial direction, and more specifically, positions thereof coincide with each other in the outer cylinder axial direction. The hole portion 35 and the through hole 41B have the same inner diameter.

Also, the extension part 27B includes a through hole 42B (reduced-rigidity part) having the same shape as the through hole 41B and formed at a predetermined disposition position on the outer cylinder 17 side of the hole portion 36 at the same position in the outer cylinder axial direction as the hole portion 36. The through hole 42B penetrates from the facing surface 27Ba to the non-facing surface 27Bb of the extension part 27B. In other words, the hole portion 36 and the through hole 42B overlap each other in position in the outer cylinder axial direction, and more specifically, positions thereof coincide with each other in the outer cylinder axial direction. The hole portion 36 and the through hole 42B have the same inner diameter.

These two through holes 41B and 42B are disposed at end portion positions of the facing surface 27Ba of the extension part 27B on the outer cylinder 17 side and are provided to be spaced apart in the outer cylinder axial direction at the same position as each other in an outer cylinder radial direction. The extension part 27B has a reduced thickness and lower rigidity at the disposition positions of the through holes 41B and 42B in the outer cylinder radial direction than at positions different from the disposition positions in the outer cylinder radial direction. The extension part 27B includes a base part 51B at an end edge on the outer cylinder 17 side at which the two through holes 41B and 42B are formed, and an adjacent part 52B adjacent to the base part 51B on an outer side in the outer cylinder radial direction. The base part 51B has a lower rigidity than the adjacent part 52B.

The extension part 28B includes a through hole 43B (reduced-rigidity part) formed at a predetermined disposition position on the outer cylinder 17 side of the hole portion 37 at the same position in the outer cylinder axial direction as the hole portion 37. The extension part 28B has a facing surface 28Ba facing the extension part 27B and a non-facing surface 28Bb facing in a direction opposite to the extension part 27B. The through hole 43B penetrates from the facing surface 28Ba to the non-facing surface 28Bb of the extension part 28B. In other words, the hole portion 37 and the through hole 43B overlap each other in position in the outer cylinder axial direction. More specifically, positions of the hole portion 37 and the through hole 43B coincide with each other in the outer cylinder axial direction. The through hole 43B coincides with the through hole 41B in position in the outer cylinder axial direction and in the outer cylinder radial direction. The through hole 43B has a symmetrical shape with respect to the through hole 41B and is disposed on the same straight line as the through hole 41B.

The extension part 28B includes a through hole 44B (reduced-rigidity part) having the same shape as the through hole 43B and formed at a predetermined disposition position on the outer cylinder 17 side of the hole portion 38 at the same position in the outer cylinder axial direction as the hole portion 38. The through hole 44B penetrates from the facing surface 28Ba to the non-facing surface 28Bb of the extension part 28B. In other words, the hole portion 38 and the through hole 44B overlap each other in position in the outer cylinder axial direction. More specifically, positions of the hole portion 38 and the through hole 44B coincide with each other in the outer cylinder axial direction. The through hole 44B coincides with the through hole 42B in position in the outer cylinder axial direction and in the outer cylinder radial direction. The through hole 44B has a symmetrical shape with respect to the through hole 42B and is disposed on the same straight line as the through hole 42B.

These two through holes 43B and 44B are provided to be spaced apart in the outer cylinder axial direction at the same position as each other in the outer cylinder radial direction. The extension part 28B has a reduced thickness and lower rigidity at the disposition positions of the through holes 43B and 44B in the outer cylinder radial direction than at positions different from the disposition positions in the outer cylinder radial direction. The extension part 28B includes a base part 53B at an end edge on the outer cylinder 17 side at which the two through holes 43B and 44B are formed, and an adjacent part 54B adjacent to the base part 53B on an outer side in the outer cylinder radial direction. The base part 53B has a lower rigidity than the adjacent part 54B.

Figure 8A:
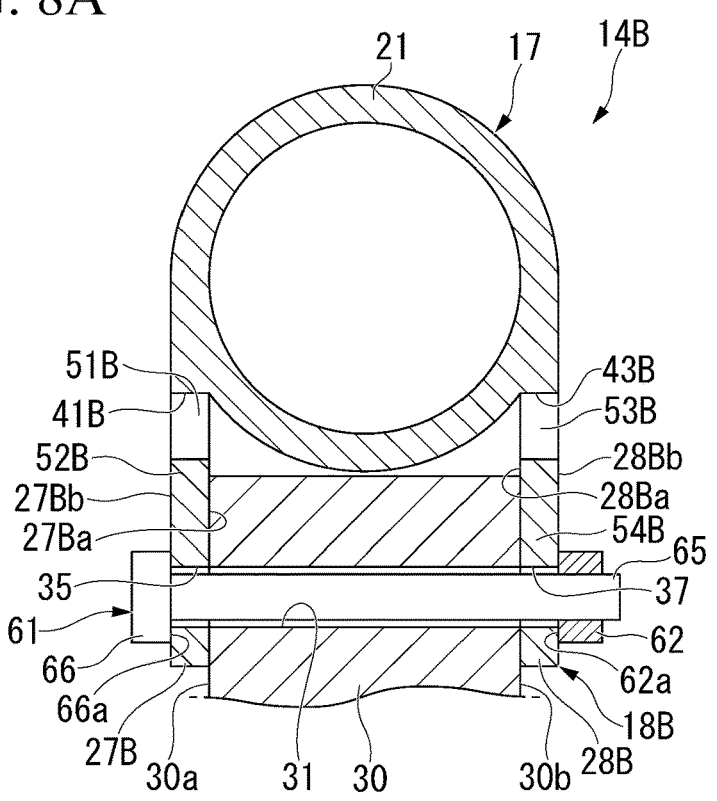
FIG. 8A is a transverse sectional view illustrating the outer cylinder member and the like of the shock absorber according to the third embodiment of the present invention.
Figure 8B:
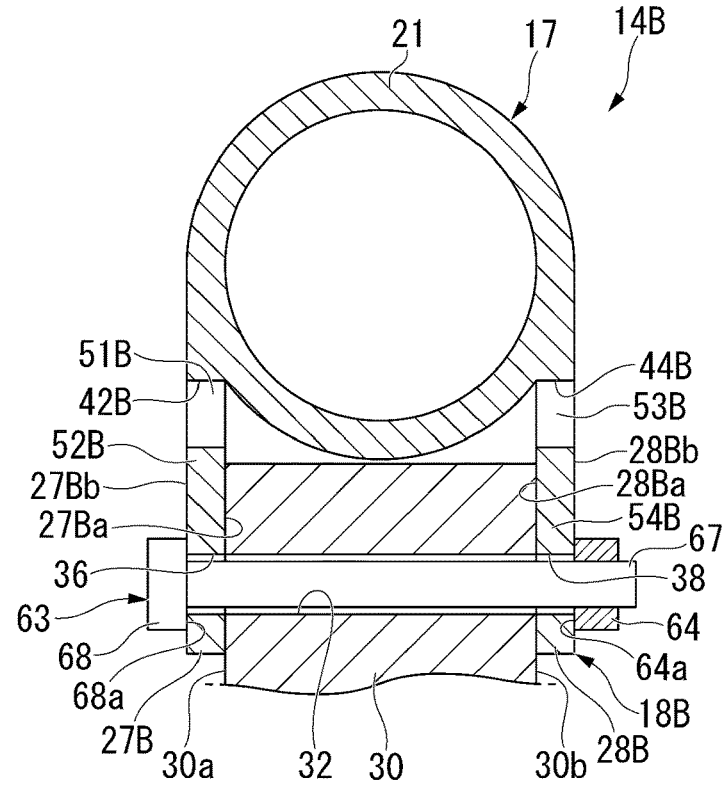
FIG. 8B is a transverse sectional view illustrating the outer cylinder member and the like of the shock absorber according to the third embodiment of the present invention.

As illustrated in FIGS. 8A and 8B, similarly to the bracket 18 of the first embodiment, the bracket 18B is connected to a knuckle 30 on a wheel side by a bolt 61 and a nut 62 screwed onto the bolt 61, and a bolt 63 and a nut 64 screwed onto the bolt 63. The bolt 61 is inserted into the two hole portions 35 and 37 on a first end side in the outer cylinder axial direction. The bolt 63 is inserted into the two hole portions 36 and 38 on a second end side in the outer cylinder axial direction. At this time, the extension parts 27B and 28B have a low bending rigidity at the base parts 51B and 53B. Therefore, the base parts 51B and 53B are mainly deformed, and the extension parts 27B and 28B are relatively easily deformed as in the extension parts 27 and 28 of the first embodiment.

In the bracket 18B of the third embodiment, the through holes 41B and 43B are provided in the pair of extension parts 27B and 28B. The through holes 41B and 43B are disposed at the disposition positions on the outer cylinder 17 side of the hole portions 35 and 37 at the same positions in the outer cylinder axial direction as the hole portions 35 and 37. The through holes 41B and 43B have a lower rigidity than positions different from the disposition positions. Also, the through holes 42B and 44B are provided in the pair of extension parts 27B and 28B. The through holes 42B and 44B are disposed at the disposition positions on the outer cylinder 17 side of the hole portions 36 and 38 at the same positions in the outer cylinder axial direction as the hole portions 36 and 38. The through holes 42B and 44B have a lower rigidity than positions different from the disposition positions. The through holes 41B and 42B penetrate the extension part 27B in a plate thickness direction, and the through holes 43B and 44B penetrate the extension part 28B in a plate thickness direction. Thereby, bending of the bracket 18B can be further promoted. Therefore, even if fastening axial forces of the bolts 61 and 63 and the nuts 62 and 64 are set to be small, surface pressures of seat surfaces 66*a*, 68*a*, 62*a*, and 64*a* of the bolts 61 and 63 and the nuts 62 and 64 can be secured, and stability of the fastening can be further enhanced. Thereby, further improvement in efficiency of assembling the bracket 18B to the knuckle 30 can be achieved.

Also, in the bracket 18B of the third embodiment, the through holes 41B and 42B penetrate the extension part 27B in the plate thickness direction, and the through holes 43B and 44B penetrate the extension part 28B in the plate thickness direction. Therefore, further weight reduction can be achieved.

Also, in the bracket 18B of the third embodiment, the through holes 41B and 42B penetrate the extension part 27B in the plate thickness direction, and the through holes 43B and 44B penetrate the extension part 28B in the plate thickness direction. Therefore, these through holes 41B to 44B can be formed by hole boring processing by cutting as in the hole portions 35 to 38. Therefore, formation of the through holes 41B to 44B is facilitated.

Further, in the bracket 18B of the third embodiment, of the through holes 41B to 44B, for example, only the through holes 41B and 43B can be formed or only the through holes 42B and 44B can be formed. That is, at least one of the through holes 41B to 44B may be formed.

Also, in the bracket 18B of the third embodiment, as in the modified example described in the first embodiment, at least one of the through holes 41B to 44B may be entirely or partially filled with a low-rigidity material having a rigidity lower than that of the outer cylinder member 14B including the pair of extension parts 27B and 28B. It is possible to configure such that, for example, the entire through holes 41B and 42B are filled with a low-rigidity material to form reduced-rigidity parts, and the entire through holes 43B and 44B are filled with the low-rigidity material to form reduced-rigidity parts. In this case, the through holes 41B and 42B may be coplanar with the facing surface 27Ba and the non-facing surface 27Bb. The through holes 43B and 44B may be coplanar with the facing surface 28Ba and the non-facing surface 28Bb.

Fourth Embodiment

Next, a fourth embodiment will be described mainly on the basis of FIG. 9, FIG. 10A, and FIG. 10B, focusing on differences from the first embodiment. Also, parts common to those in the first embodiment will be denoted by the same terms and the same reference signs.

Figure 9:
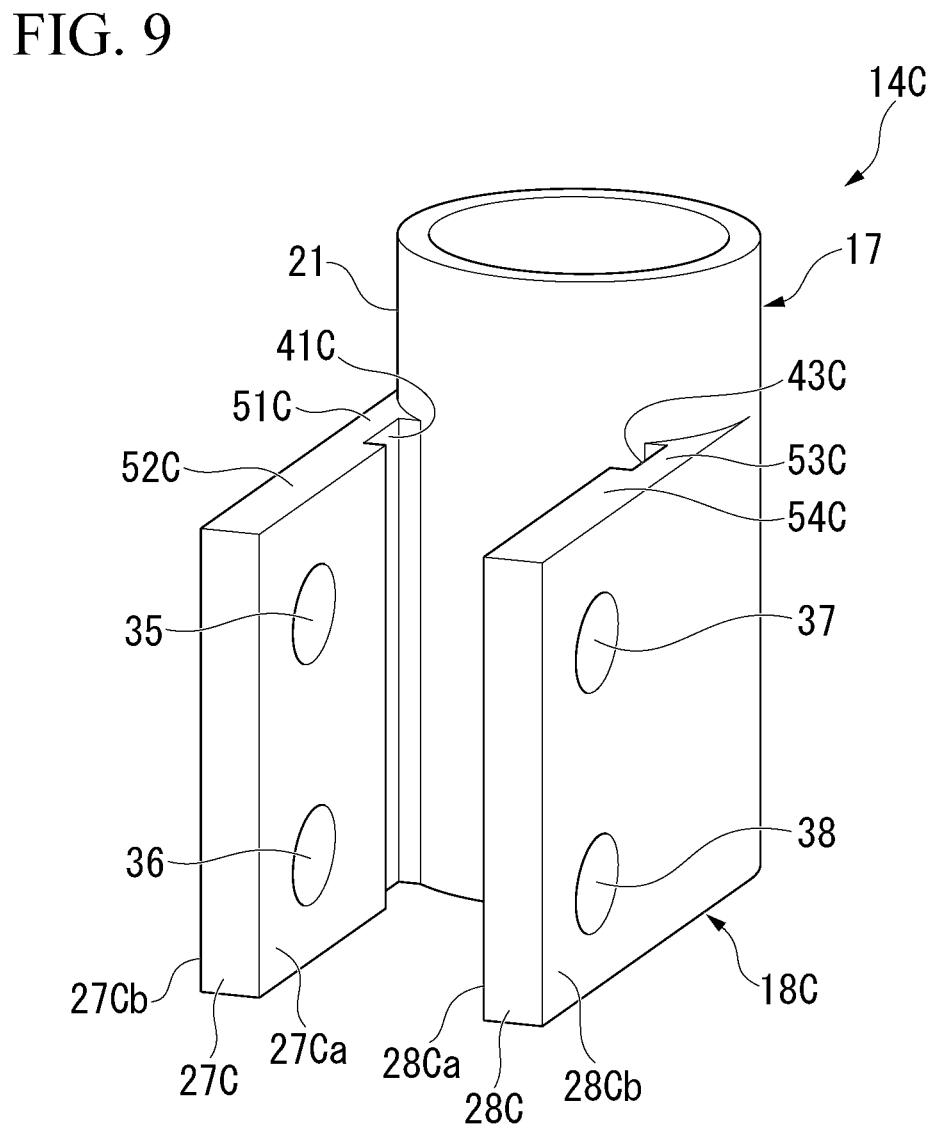

As illustrated in FIG. 9, in the fourth embodiment, an outer cylinder member 14C is used instead of the outer cylinder member 14 of the first embodiment. The outer cylinder member 14C includes a bracket 18C. The bracket 18C includes an extension part 27C and an extension part 28C.

Hole portions 35 and 36 similar to those of the extension part 27 in the first embodiment are provided in the extension part 27C. Hole portions 37 and 38 similar to those of the extension part 28 in the first embodiment are also provided in the extension part 28C.

The extension part 27C includes a recessed part 41C (reduced-rigidity part) formed at a predetermined disposition position on an outer cylinder 17 side of the hole portions 35 and 36 at the same position in an outer cylinder axial direction as the hole portions 35 and 36. The extension part 27C has a facing surface 27Ca facing the extension part 28C and a non-facing surface 27Cb facing in a direction opposite to the extension part 28C. The recessed part 41C is recessed toward the non-facing surface 27Cb side from the facing surface 27Ca of the extension part 27C. The recessed part 41C penetrates the extension part 27C in the outer cylinder axial direction. In other words, the recessed part 41C is formed to traverse the extension part 27C from one end to the other end in the outer cylinder axial direction. Therefore, the recessed part 41C overlaps the hole portions 35 and 36 in position in the outer cylinder axial direction, and is formed to straddle the entire hole portions 35 and 36 in the outer cylinder axial direction. The recessed part 41C is formed on the facing surface 27Ca side of the extension part 27C.

The recessed part 41C extends linearly in the outer cylinder axial direction, and is disposed at an end portion position of the facing surface 27Ca of the extension part 27C on the outer cylinder 17 side. The extension part 27C has a reduced thickness and lower rigidity at the disposition position of the recessed part 41C than at a position different from the disposition position. The extension part 27C includes a base part 51C at an end edge on the outer cylinder 17 side at which one recessed part 41C is formed, and an adjacent part 52C adjacent to the base part 51C on an outer side in an outer cylinder radial direction. The base part 51C has a lower rigidity than the adjacent part 52C.

The extension part 28C includes a recessed part 43C (reduced-rigidity part) formed at a predetermined disposition position on the outer cylinder 17 side of the hole portions 37 and 38 at the same position in the outer cylinder axial direction as the hole portions 37 and 38. The extension part 28C has a facing surface 28Ca facing the extension part 27C and a non-facing surface 28Cb facing in a direction opposite to the extension part 27C. The recessed part 43C is recessed toward the non-facing surface 28Cb side from the facing surface 28Ca of the extension part 28C. The recessed part 43C penetrates the extension part 28C in the outer cylinder axial direction. In other words, the recessed part 43C is formed to traverse the extension part 28C from one end to the other end in the outer cylinder axial direction. Therefore, the recessed part 43C overlaps the hole portions 37 and 38 in position in the outer cylinder axial direction, and is formed to straddle the entire hole portions 37 and 38 in the outer cylinder axial direction. The recessed part 43C is formed on the facing surface 28Ca side of the extension part 28C. The recessed part 43C coincides with the recessed part 41C in position in the outer cylinder radial direction. The recessed part 43C has a mirror-symmetrical shape with respect to the recessed part 41C.

The recessed part 43C extends linearly in the outer cylinder axial direction, and is disposed at an end portion position of the facing surface 28Ca of the extension part 28C on the outer cylinder 17 side. The extension part 28C has a reduced thickness and lower rigidity at the disposition position of the recessed part 43C than at a position different from the disposition position. The extension part 28C includes a base part 53C at an end edge on the outer cylinder 17 side at which one recessed part 43C is formed, and an adjacent part 54C adjacent to the base part 53C on an outer side in the outer cylinder radial direction. The base part 53C has a lower rigidity than the adjacent part 54C.

Figure 10A:
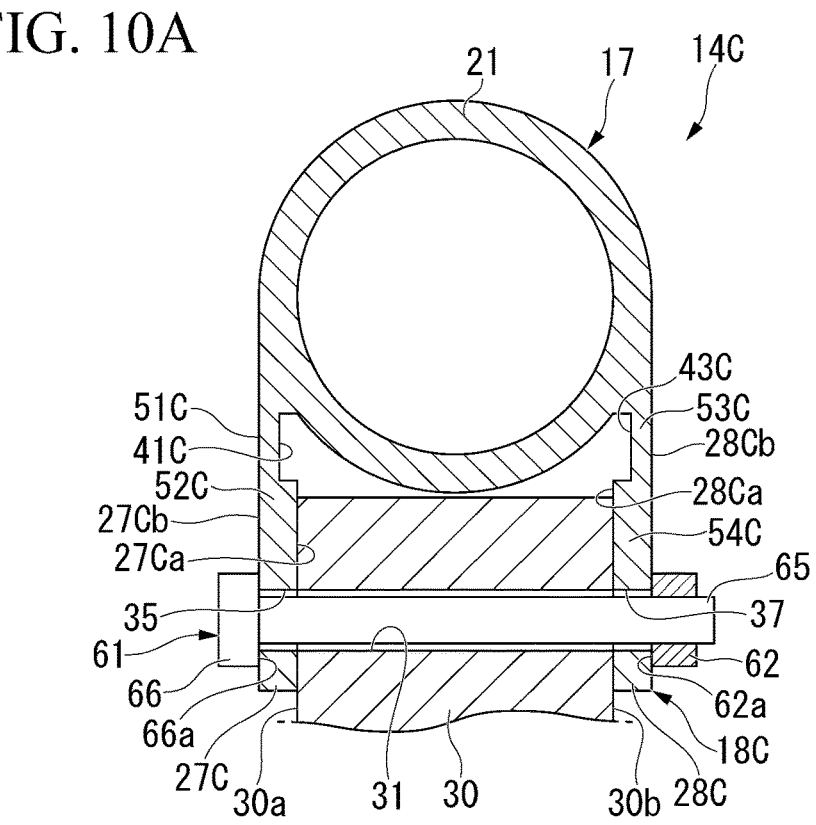
FIG. 10A is a transverse sectional view illustrating the outer cylinder member and the like of the shock absorber according to the fourth embodiment of the present invention.
Figure 10B:
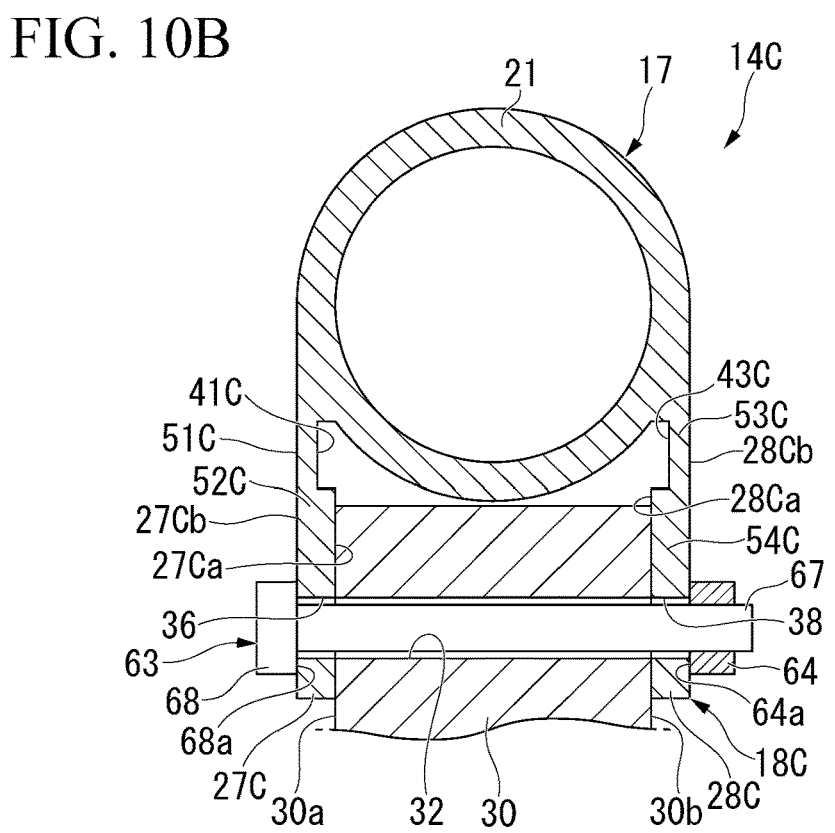
FIG. 10B is a transverse sectional view illustrating the outer cylinder member and the like of the shock absorber according to the fourth embodiment of the present invention.

As illustrated in FIGS. 10A and 10B, similarly to the bracket 18 of the first embodiment, the bracket 18C is connected to a knuckle 30 on a wheel side by a bolt 61 and a nut 62 screwed onto the bolt 61, and a bolt 63 and a nut 64 screwed onto the bolt 63. The bolt 61 is inserted into the two hole portions 35 and 37 on a first end side in the outer cylinder axial direction. The bolt 63 is inserted into the two hole portions 36 and 38 on a second end side in the outer cylinder axial direction. At this time, the extension parts 27C and 28C have a lower bending rigidity at the base parts 51C and 53C.

Therefore, the base parts 51C and 53C are mainly deformed, and the extension parts 27C and 28C are relatively easily deformed as in the extension parts 27 and 28 of the first embodiment.

In the bracket 18C of the fourth embodiment, the recessed parts 41C and 43C are provided in the pair of extension parts 27C and 28C. The recessed parts 41C and 43C are disposed at the disposition positions on the outer cylinder 17 side of the hole portions 35 to 38 at the same positions in the outer cylinder axial direction as the hole portions 35 to 38. The recessed parts 41C and 43C have a lower rigidity than positions different from the disposition positions. The recessed part 41C traverses the extension part 27C from one end to the other end in the outer cylinder axial direction, and the recessed part 43C traverses the extension part 28C from one end to the other end in the outer cylinder axial direction. Thereby, bending of the bracket 18C can be further promoted. Therefore, even if fastening axial forces of the bolts 61 and 63 and the nuts 62 and 64 are set to be even smaller, surface pressures of seat surfaces 66*a*, 68*a*, 62*a*, and 64*a* of the bolts 61 and 63 and the nuts 62 and 64 can be secured, and stability of the fastening can be further enhanced. Thereby, further improvement in efficiency of assembling the shock absorber 10 to the knuckle 30 can be achieved.

Also, in the bracket 18C of the fourth embodiment, the recessed part 41C traverses the extension part 27C from one end to the other end in the outer cylinder axial direction, and the recessed part 43C traverses the extension part 28C from one end to the other end in the outer cylinder axial direction. Therefore, the recessed parts 41C and 43C can be cast with a mold at the time of casting the outer cylinder member 14C, and the bracket 18C is excellent in productivity.

Also, in the bracket 18C of the fourth embodiment, since the recessed part 41C traverses the extension part 27C from one end to the other end in the outer cylinder axial direction, and the recessed part 43C traverses the extension part 28C from one end to the other end in the outer cylinder axial direction, further weight reduction can be achieved.

Also, in the bracket 18C of the fourth embodiment, the recessed parts 41C and 43C are formed on the facing surfaces 27Ca and 28Ca on an inner side of the pair of extension parts 27C and 28C. Therefore, compared to a case in which the recessed parts 41C and 43C are formed on the non-facing surfaces 27Cb and 28Cb side on an outer side, it is possible to suppress an increase in stress generated when a bending load is applied.

Further, in the bracket 18C of the fourth embodiment, of the recessed parts 41C and 43C, for example, only the recessed part 41C can be formed or only the recessed part 43C can be formed. That is, at least one of the recessed parts 41C and 43C may be formed.

Also, in the bracket 18C of the fourth embodiment, as in the modified example described in the first embodiment, at least one of the recessed parts 41C and 42C may be entirely or partially filled with a low-rigidity material having a rigidity lower than that of the outer cylinder member 14C including the pair of extension parts 27C and 28C. It is possible to configure such that, for example, the entire recessed part 41C is filled with a low-rigidity material to form a reduced-rigidity part, and the entire recessed parts 43C is filled with the low-rigidity material to form a reduced-rigidity part. In this case, the recessed part 41C may be coplanar with the facing surface 27Ca. The recessed part 43C may be coplanar with the facing surface 28Ca.

Fifth Embodiment

Next, a fifth embodiment will be described mainly on the basis of FIG. 11, FIG. 12A, and FIG. 12B, focusing on differences from the first embodiment. Also, parts common to those in the first embodiment will be denoted by the same terms and the same reference signs.

Figure 11:
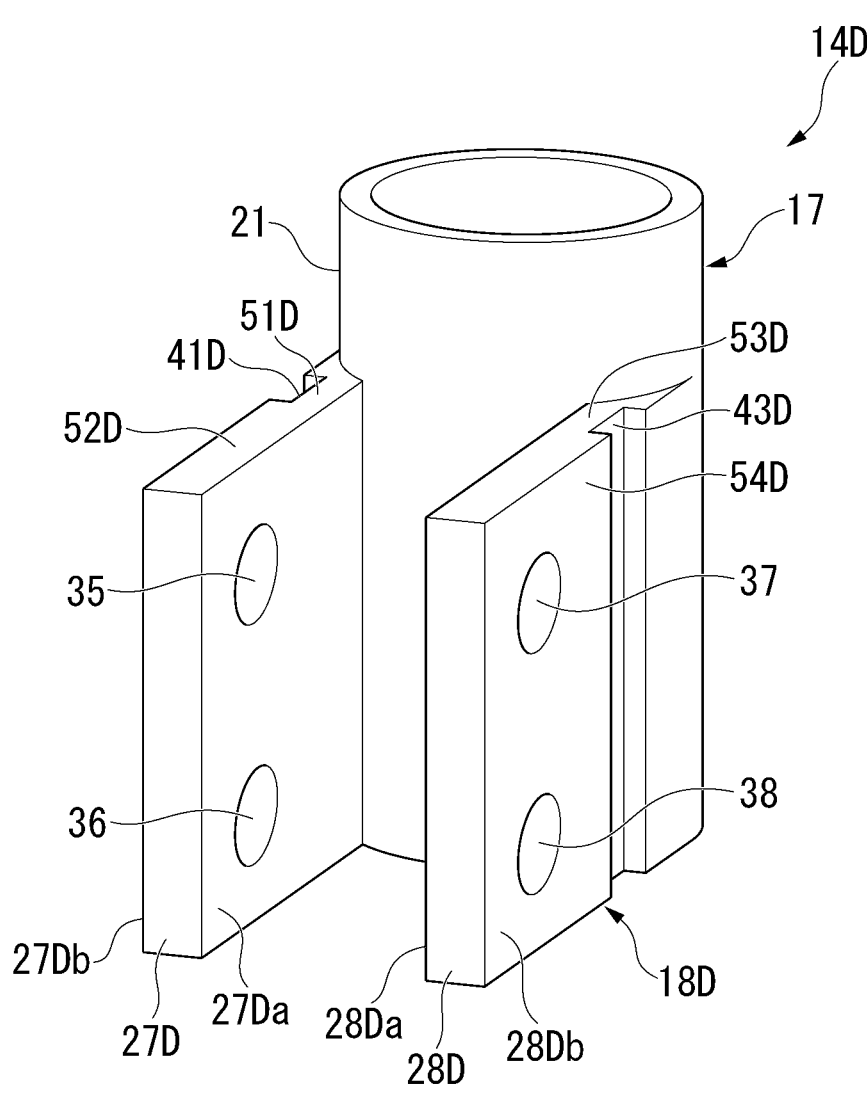
FIG. 11 is a partial perspective view illustrating an outer cylinder member of a shock absorber according to a fifth embodiment of the present invention.

As illustrated in FIG. 11, in the fifth embodiment, an outer cylinder member 14D is used instead of the outer cylinder member 14 of the first embodiment. The outer cylinder member 14D includes a bracket 18D. The bracket 18D includes an extension part 27D and an extension part 28D.

Hole portions 35 and 36 similar to those of the extension part 27 in the first embodiment are provided in the extension part 27D, and hole portions 37 and 38 on the other side similar to those of the extension part 28 in the first embodiment are provided in the extension part 28D.

The extension part 27D includes a recessed part 41D (reduced-rigidity part) formed at a predetermined disposition position on an outer cylinder 17 side of the hole portions 35 and 36 at the same position in an outer cylinder axial direction as the hole portions 35 and 36. The extension part 27D has a facing surface 27Da facing the extension part 28D and a non-facing surface 27Db facing in a direction opposite to the extension part 28D. The recessed part 41D is recessed toward the facing surface 27Da side from the non-facing surface 27Db of the extension part 27D. The recessed part 41D extends linearly in the outer cylinder axial direction and penetrates the extension part 27D in the outer cylinder axial direction. In other words, the recessed part 41D is formed to traverse the extension part 27D from one end to the other end in the outer cylinder axial direction. Therefore, the recessed part 41D overlaps the hole portions 35 and 36 in position in the outer cylinder axial direction, and is formed to straddle the entire hole portions 35 and 36 in the outer cylinder axial direction. The recessed part 41D is formed on the non-facing surface 27Db side of the extension part 27D.

The extension part 27D has a reduced thickness and lower rigidity at the disposition position of the recessed part 41D than at a position different from the disposition position. The extension part 27D includes a base part 51D on the outer cylinder 17 side at which one recessed part 41D is formed, and an adjacent part 52D adjacent to the base part 51D on an outer cylinder radial direction. The base part 51D has a lower rigidity than the adjacent part 52D.

The extension part 28D includes a recessed part 43D (reduced-rigidity part) formed at a predetermined disposition position on the outer cylinder 17 side of the hole portions 37 and 38 at the same position in the outer cylinder axial direction as the hole portions 37 and 38. The extension part 28D has a facing surface 28Da facing the extension part 27D and a non-facing surface 28Db facing in a direction opposite to the extension part 27D. The recessed part 43D is recessed toward the facing surface 28Da side from the non-facing surface 28Db of the extension part 28D. The recessed part 43D extends linearly in the outer cylinder axial direction and penetrates the extension part 28D in the outer cylinder axial direction. In other words, the recessed part 43D is formed to traverse the extension part 28D from one end to the other end in the outer cylinder axial direction. Therefore, the recessed part 43D overlaps the hole portions 37 and 38 in position in the outer cylinder axial direction, and is formed to straddle the entire hole portions 37 and 38 in the outer cylinder axial direction. The recessed part 43D is formed on the non-facing surface 28Db side of the extension part 28D. The recessed part 43D coincides with the recessed part 41D in position in the outer cylinder radial direction. The recessed part 43D has a mirror-symmetrical shape with respect to the recessed part 41D.

The extension part 28D has a reduced thickness and lower rigidity at the disposition position of the recessed part 43D than at a position different from the disposition position. The extension part 28D includes a base part 53D on the outer cylinder 17 side at which one recessed part 43D is formed, and an adjacent part 54D adjacent to the base part 53D on an outer side in an outer cylinder radial direction. The base part 53D has a lower rigidity than the adjacent part 54D.

Figure 12A:
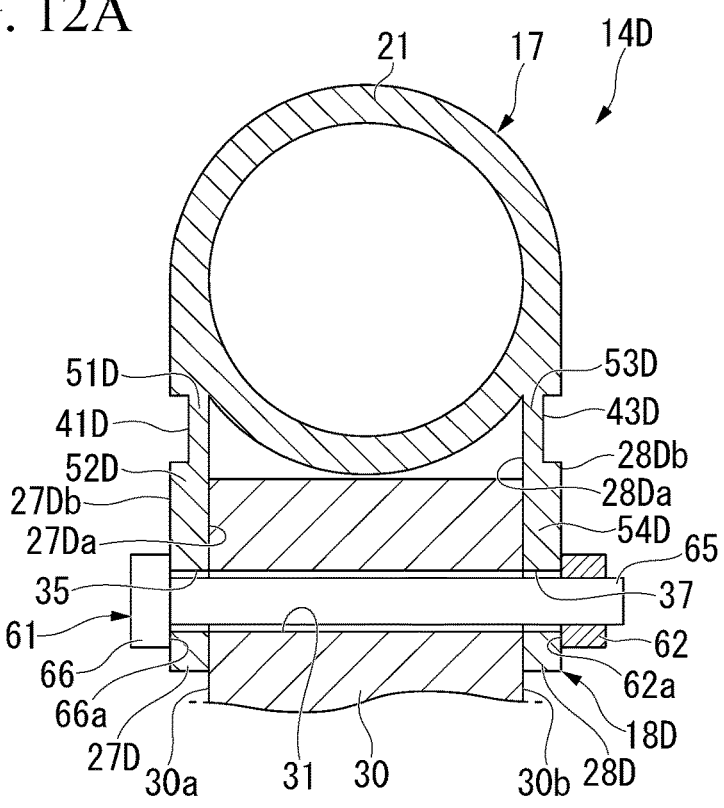
FIG. 12A is a transverse sectional view illustrating the outer cylinder member and the like of the shock absorber according to the fifth embodiment of the present invention.
Figure 12B:
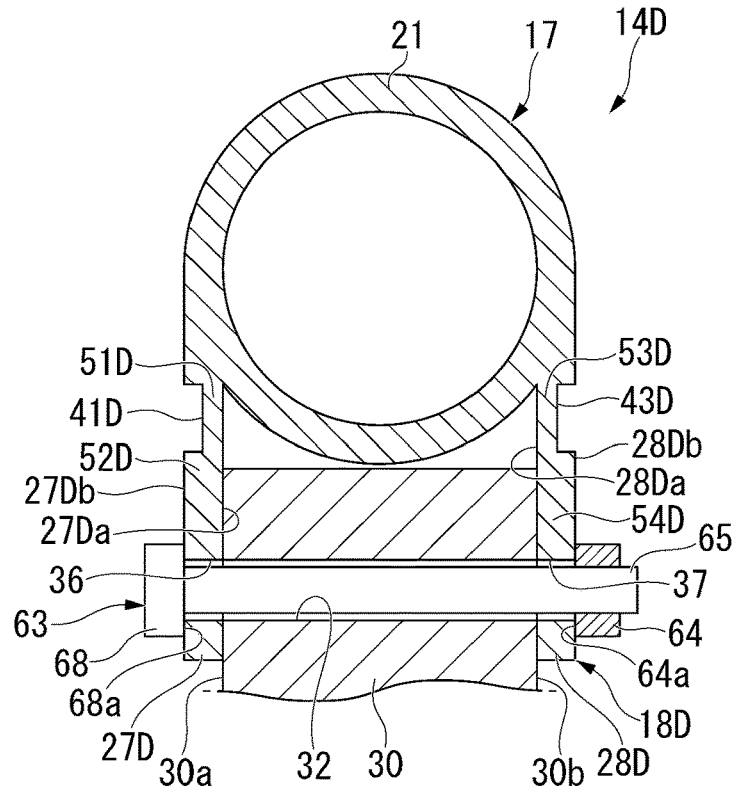
FIG. 12B is a transverse sectional view illustrating the outer cylinder member and the like of the shock absorber according to the fifth embodiment of the present invention.

As illustrated in FIGS. 12A and 12B, similarly to the bracket 18 of the first embodiment, the bracket 18D of the fifth embodiment is connected to a knuckle 30 on a wheel side by a bolt 61 and a nut 62 screwed onto the bolt 61, and a bolt 63 and a nut 64 screwed onto the bolt 63. The bolt 61 is inserted into the two hole portions 35 and 37 on a first end side in the outer cylinder axial direction. The bolt 63 is inserted into the two hole portions 36 and 38 on a second end side in the outer cylinder axial direction. At this time, the extension parts 27D and 28D have a lower bending rigidity at the base parts 51D and 53D. Therefore, the base parts 51D and 53D are mainly deformed, and the extension parts 27D and 28D are relatively easily deformed as in the extension parts 27 and 28 of the first embodiment.

In the bracket 18D of the fifth embodiment, the recessed parts 41D and 43D are provided in the pair of extension parts 27D and 28D. The recessed parts 41D and 43D are disposed at the disposition positions on the outer cylinder 17 side of the hole portions 35 to 38 at the same positions in the outer cylinder axial direction as the hole portions 35 to 38. The recessed parts 41D and 43D have a lower rigidity than positions different from the disposition positions. The recessed part 41D traverses the extension part 27D from one end to the other end in the outer cylinder axial direction, and the recessed part 43D traverses the extension part 28D from one end to the other end in the outer cylinder axial direction. Thereby, bending of the bracket 18D can be further promoted. Therefore, even if fastening axial forces of the bolts 61 and 63 and the nuts 62 and 64 are set to be even smaller, surface pressures of seat surfaces 66a, 68a, 62a, and 64a of the bolts 61 and 63 and the nuts 62 and 64 can be secured, and stability of the fastening can be further enhanced. Thereby, further improvement in efficiency of assembling the shock absorber 10 to the knuckle 30 can be achieved.

Also, in the bracket 18D of the fifth embodiment, the recessed part 41D traverses the extension part 27D from one end to the other end in the outer cylinder axial direction, and the recessed part 43D traverses the extension part 28D from one end to the other end in the outer cylinder axial direction. Therefore, the recessed parts 41D and 43D can be cast with a mold at the time of casting the outer cylinder member 14D, and the bracket 18D is excellent in productivity.

Also, in the bracket 18D of the fifth embodiment, since the recessed part 41D traverses the extension part 27D from one end to the other end in the outer cylinder axial direction, and the recessed part 43D traverses the extension part 28D from one end to the other end in the outer cylinder axial direction, further weight reduction can be achieved.

Further, in the bracket 18D of the fifth embodiment, of the recessed parts 41D and 43D, for example, only the recessed part 41D can be formed or only the recessed part 43D can be formed. That is, at least one of the recessed parts 41D and 43D may be formed.

Also, in the bracket 18D of the fifth embodiment, as in the modified example described in the first embodiment, at least one of the recessed parts 41D and 43D may be entirely or partially filled with a low-rigidity material having a rigidity lower than that of the outer cylinder member 14D including the pair of extension parts 27D and 28D. It is possible to configure such that, for example, the entire recessed part 41D is filled with a low-rigidity material to form a reduced-rigidity part, and the entire recessed part 43D is filled with the low-rigidity material to form a reduced-rigidity part. In this case, the recessed part 41D may be coplanar with the non-facing surface 27Db. The recessed part 43D may be coplanar with the non-facing surface 28Db.

Sixth Embodiment

Figure 13:
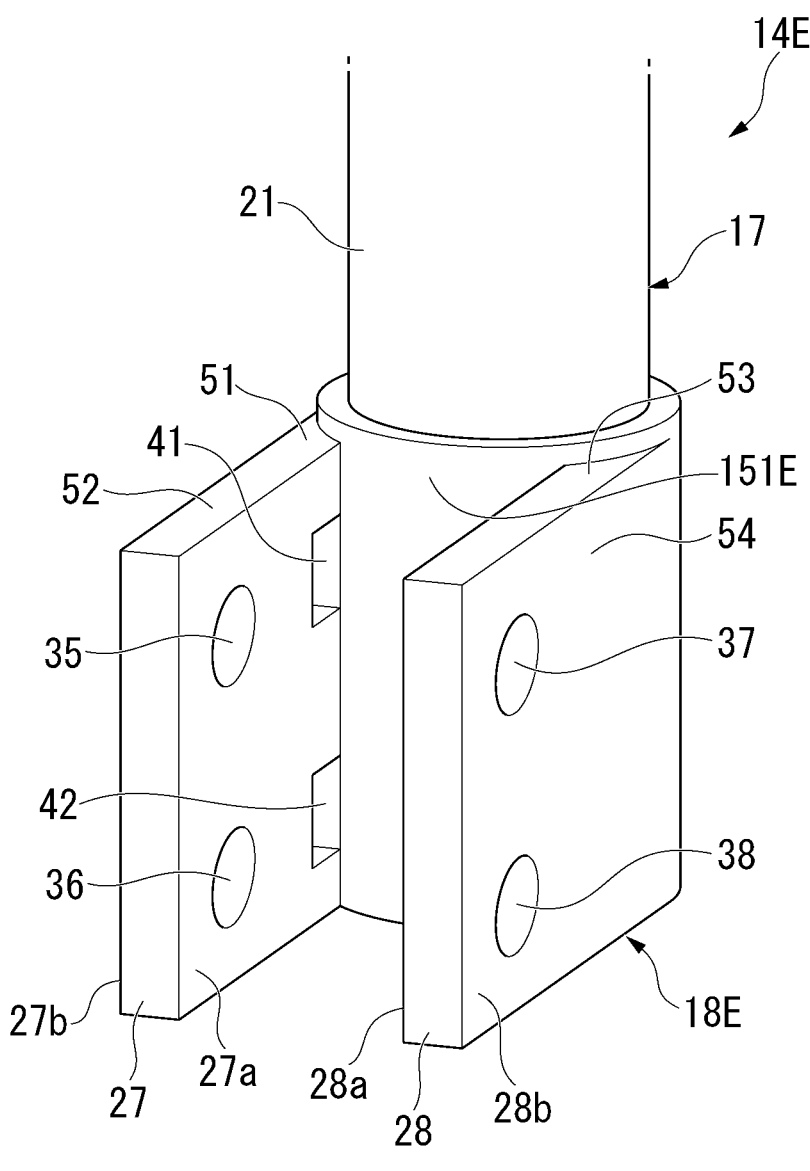
FIG. 13 is a partial perspective view illustrating an outer cylinder member of a shock absorber according to a sixth embodiment of the present invention.

Next, a sixth embodiment will be described mainly on the basis of FIG. 13, focusing on differences from the first embodiment. Also, parts common to those in the first embodiment will be denoted by the same terms and the same reference signs.

In the sixth embodiment, an outer cylinder member 14E is used instead of the outer cylinder member 14 of the first embodiment. The outer cylinder member 14E is constituted by two parts including an outer cylinder 17 similar to that of the first embodiment, and a bracket 18E that is separate from the outer cylinder 17. The bracket 18E includes a cylindrical fitting part 151E, and a pair of extension parts 27 and 28 similar to those of the first embodiment and extending from the fitting part 151E. The fitting part 151E is fitted and fixed on an outer circumference of the outer cylinder 17. The bracket 18E is an integrally molded product in which the fitting part 151E and the pair of extension parts 27 and 28 are integrally and seamlessly formed. The bracket 18E is formed of a metal that is shaped by heat and a force. Specifically, the bracket 18E is formed by casting an aluminum alloy.

The bracket 18E is fitted on an outer circumference of a side wall part 21 of the outer cylinder 17 on a second end side in an outer cylinder axial direction at the fitting part 151E thereof and is fixed by welding or the like. Thereby, the outer cylinder member 14E is formed. The outer cylinder member 14E includes the pair of extension parts 27 and 28 similar to those of the first embodiment. In the outer cylinder member 14E, the pair of extension parts 27 and 28 have the same positional relationship with respect to the outer cylinder 17 as in the first embodiment. In the outer cylinder member 14E, the pair of extension parts 27 and 28 include recessed parts 41 to 44, that is, base parts 51 and 53, at end portions on the fitting part 151E side.

In the sixth embodiment, the bracket 18E is constituted by the fitting part 151E fitted on the outer circumference of the outer cylinder 17, and the pair of extension parts 27 and 28 that are integrally formed with the fitting part 151E. Therefore, the bracket 18E and the outer cylinder 17 can be molded using different materials or different molding methods.

Also in the bracket 18E of the sixth embodiment, at least one of the recessed parts 41 to 44 may be formed. Also, at least one of the recessed parts 41 to 44 may be filled with a low-rigidity material having a rigidity lower than that of the bracket 18E.

Seventh Embodiment

Figure 14:
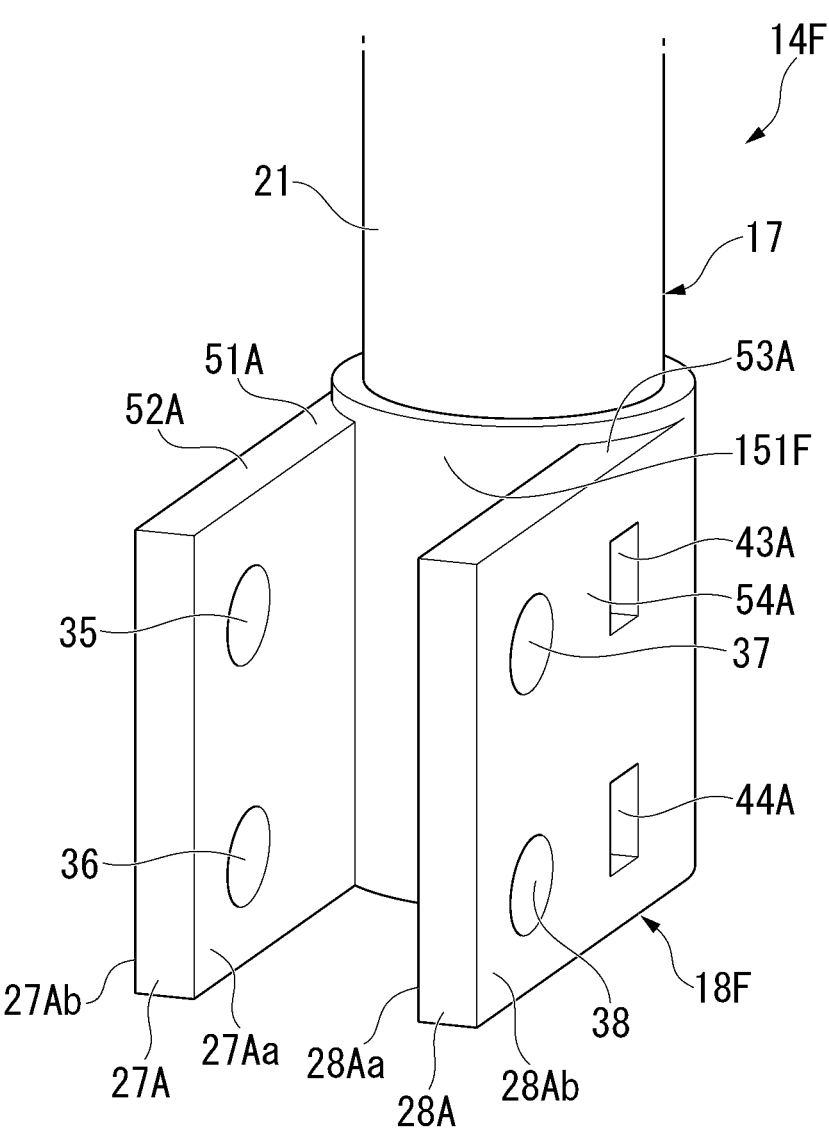
FIG. 14 is a partial perspective view illustrating an outer cylinder member of a shock absorber according to a seventh embodiment of the present invention.

Next, a seventh embodiment will be described mainly on the basis of FIG. 14, focusing on differences from the second embodiment. Also, parts common to those in the second embodiment will be denoted by the same terms and the same reference signs.

In the seventh embodiment, an outer cylinder member 14F is used instead of the outer cylinder member 14A of the second embodiment. The outer cylinder member 14F is constituted by two parts including an outer cylinder 17 similar to that of the second embodiment, and a bracket 18F that is separate from the outer cylinder 17. The bracket 18F includes a cylindrical fitting part 151F, and a pair of extension parts 27A and 28A similar to those of the second embodiment and extending from the fitting part 151F. The fitting part 151F is fitted and fixed on an outer circumference of the outer cylinder 17. The bracket 18F is an integrally molded product in which the fitting part 151F and the pair of extension parts 27A and 28A are integrally and seamlessly formed. The bracket 18F is formed of a metal that is shaped by heat and a force. Specifically, the bracket 18F is formed by casting an aluminum alloy.

The bracket 18F is fitted on an outer circumference of a side wall part 21 of the outer cylinder 17 on a second end side in an outer cylinder axial direction at the fitting part 151F thereof and is fixed by welding or the like. Thereby, the outer cylinder member 14F is formed. The outer cylinder member 14F includes the pair of extension parts 27A and 28A similar to those of the second embodiment. In the outer cylinder member 14F, the pair of extension parts 27A and 28A have the same positional relationship with respect to the outer cylinder 17 as in the second embodiment. In the outer cylinder member 14F, the pair of extension parts 27A and 28A include recessed parts 41A to 44A, that is, base parts 51A and 53A, at end portions on the fitting part 151F side.

Also in the bracket 18F of the seventh embodiment, at least one of the recessed parts 41A to 44A may be provided. Also, at least one of the recessed parts 41A to 44A may be filled with a low-rigidity material having a rigidity lower than that of the bracket 18F.

Eighth Embodiment

Figure 15:
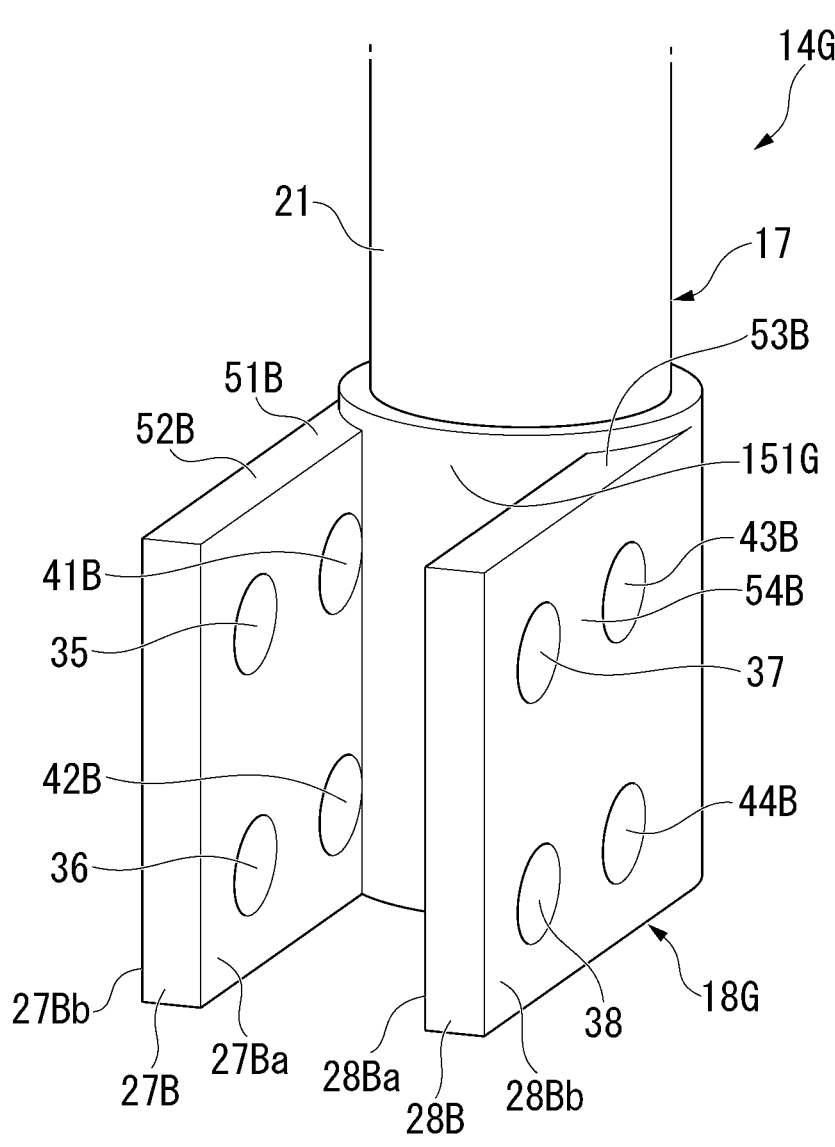
FIG. 15 is a partial perspective view illustrating an outer cylinder member of a shock absorber according to an eighth embodiment of the present invention.

Next, an eighth embodiment will be described mainly on the basis of FIG. 15, focusing on differences from the third embodiment. Also, parts common to those in the third embodiment will be denoted by the same terms and the same reference signs.

In the eighth embodiment, an outer cylinder member 14G is used instead of the outer cylinder member 14B of the third embodiment. The outer cylinder member 14G is constituted by two parts including an outer cylinder 17 similar to that of the third embodiment, and a bracket 18G that is separate from the outer cylinder 17. The bracket 18G includes a cylindrical fitting part 151G, and a pair of extension parts 27B and 28B similar to those of the third embodiment and extending from the fitting part 151G. The fitting part 151G is fitted and fixed on an outer circumference of the outer cylinder 17. The bracket 18G is an integrally molded product in which the fitting part 151G and the pair of extension parts 27B and 28B are integrally and seamlessly formed. The bracket 18G is formed of a metal that is shaped by heat and a force. Specifically, the bracket 18G is formed by casting an aluminum alloy.

The bracket 18G is fitted on an outer circumference of a side wall part 21 of the outer cylinder 17 on a second end side in an outer cylinder axial direction at the fitting part 151G thereof and is fixed by welding or the like. Thereby, the outer cylinder member 14G is formed. The outer cylinder member 14G includes the pair of extension parts 27B and 28B similar to those of the third embodiment. In the outer cylinder member 14G, the pair of extension parts 27B and 28B have the same positional relationship with respect to the outer cylinder 17 as in the third embodiment. In the outer cylinder member 14G, the pair of extension parts 27B and 28B include through holes 41B to 44B, that is, base parts 51B and 53B, at end portions on the fitting part 151G side.

Also in the bracket 18G of the eighth embodiment, at least one of the through holes 41B to 44B may be provided. Also, at least one of the through holes 41B to 44B may be filled with a low-rigidity material having a rigidity lower than that of the bracket 18G.

Ninth Embodiment

Figure 16:
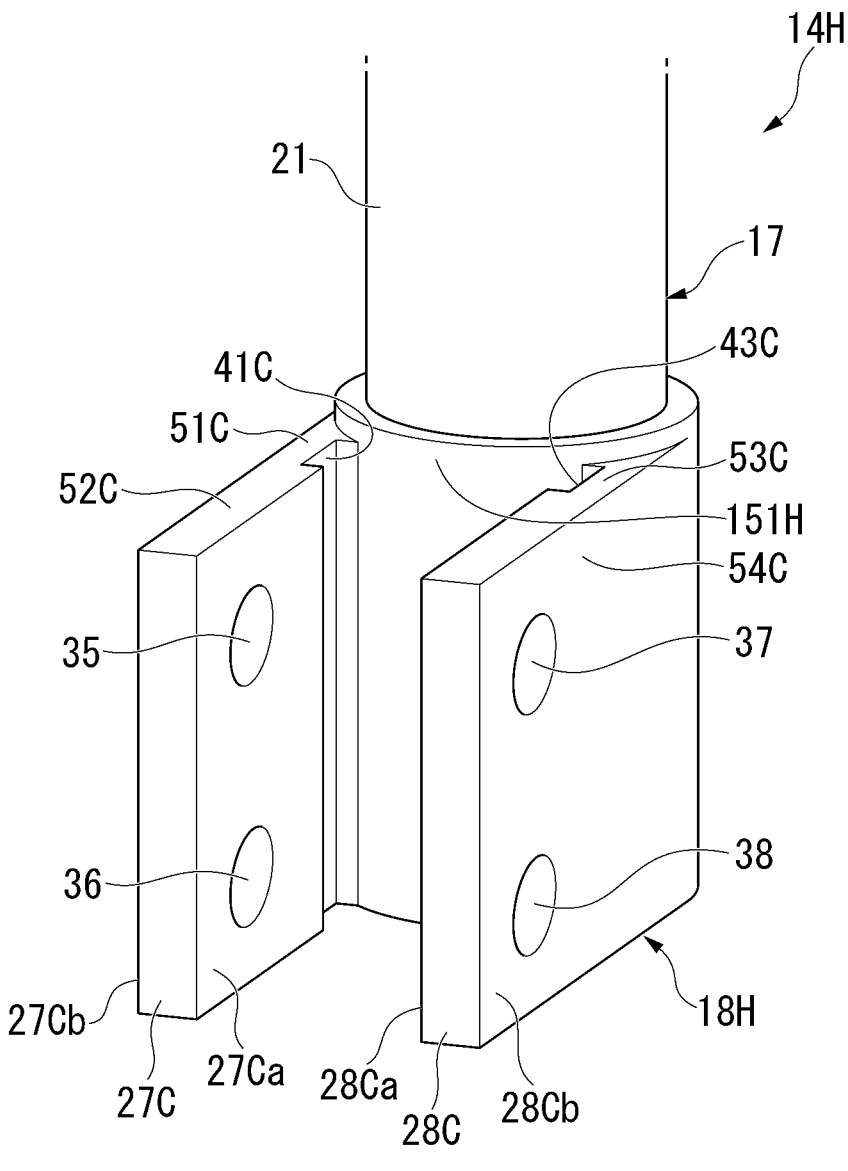
FIG. 16 is a partial perspective view illustrating an outer cylinder member of a shock absorber according to a ninth embodiment of the present invention.

Next, a ninth embodiment will be described mainly on the basis of FIG. 16, focusing on differences from the fourth embodiment. Also, parts common to those in the fourth embodiment will be denoted by the same terms and the same reference signs.

In the ninth embodiment, an outer cylinder member 14H is used instead of the outer cylinder member 14C of the fourth embodiment. The outer cylinder member 14H is constituted by two parts including an outer cylinder 17 similar to that of the fourth embodiment, and a bracket 18H that is separate from the outer cylinder 17. The bracket 18H includes a cylindrical fitting part 151H, and a pair of extension parts 27C and 28C similar to those of the fourth embodiment and extending from the fitting part 151H. The fitting part 151H is fitted and fixed on an outer circumference of the outer cylinder 17. The bracket 18H is an integrally molded product in which the fitting part 151H and the pair of extension parts 27C and 28C are integrally and seamlessly formed. The bracket 18H is formed of a metal that is shaped by heat and a force. Specifically, the bracket 18H is formed by casting an aluminum alloy.

The bracket 18H is fitted on an outer circumference of a side wall part 21 of the outer cylinder 17 on a second end side in an outer cylinder axial direction at the fitting part 151H thereof and is fixed by welding or the like. Thereby, the outer cylinder member 14H is formed. The outer cylinder member 14H includes the pair of extension parts 27C and 28C similar to those of the fourth embodiment. In the outer cylinder member 14H, the pair of extension parts 27C and 28C have the same positional relationship with respect to the outer cylinder 17 as in the fourth embodiment. In the outer cylinder member 14H, the pair of extension parts 27C and 28C include recessed parts 41C and 43C, that is, base parts 51C and 53C, at end portions on the fitting part 151H side.

Also in the bracket 18H of the ninth embodiment, at least one of the recessed parts 41C and 43C may be provided. Also, at least one of the recessed parts 41C and 43C may be filled with a low-rigidity material having a rigidity lower than that of the bracket 18H.

Tenth Embodiment

Figure 17:
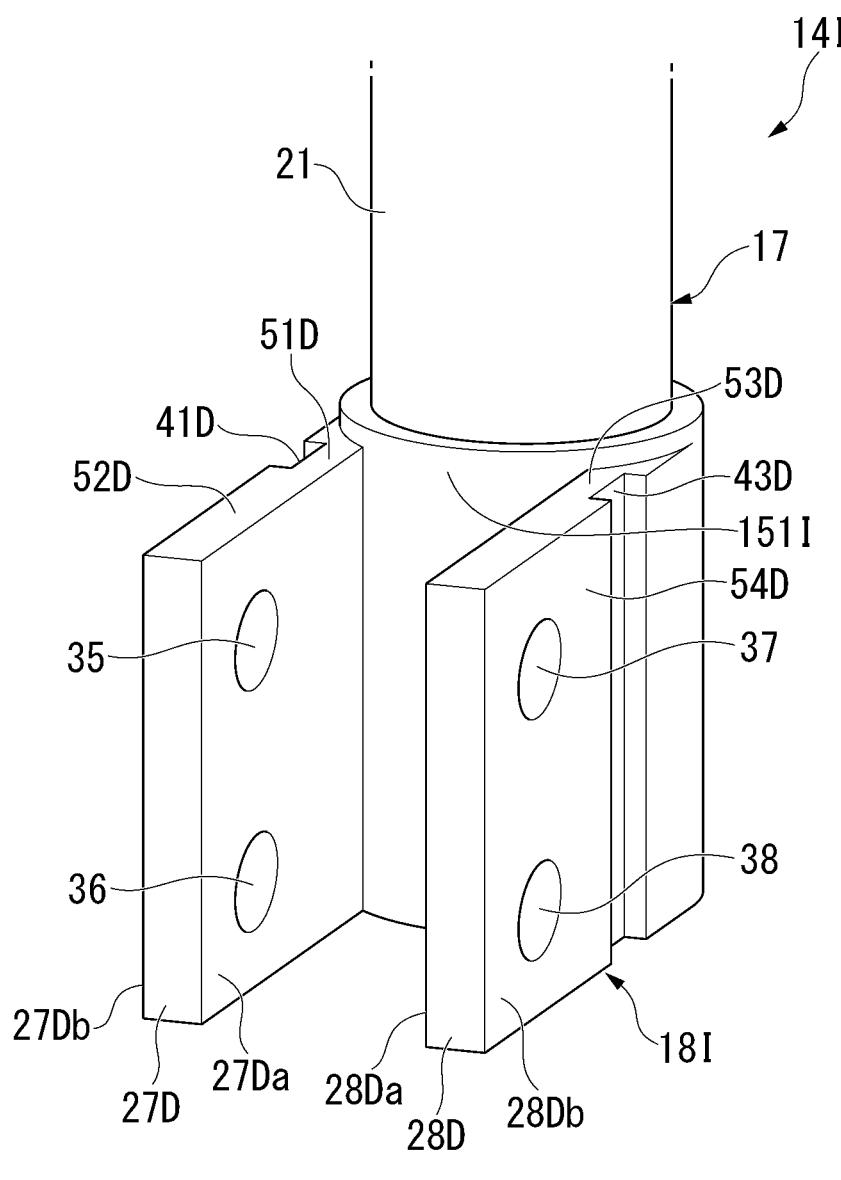
FIG. 17 is a partial perspective view illustrating an outer cylinder member of a shock absorber according to a tenth embodiment of the present invention.

Next, a tenth embodiment will be described mainly on the basis of FIG. 17, focusing on differences from the fifth embodiment. Also, parts common to those in the fifth embodiment will be denoted by the same terms and the same reference signs.

In the tenth embodiment, an outer cylinder member 14I is used instead of the outer cylinder member 14D of the fifth embodiment. The outer cylinder member 14I is constituted by two parts including an outer cylinder 17 similar to that of the fifth embodiment, and a bracket 18I that is separate from the outer cylinder 17. The bracket 18I includes a cylindrical fitting part 151I, and a pair of extension parts 27D and 28D similar to those of the fifth embodiment and extending from the fitting part 151I. The fitting part 151I is fitted and fixed on an outer circumference of the outer cylinder 17. The bracket 18I is an integrally molded product in which the fitting part 151I and the pair of extension parts 27D and 28D are integrally and seamlessly formed. The bracket 18I is formed of a metal that is shaped by heat and a force. Specifically, the bracket 18I is formed by casting an aluminum alloy.

The bracket 18I is fitted on an outer circumference of a side wall part 21 of the outer cylinder 17 on a second end side in an outer cylinder axial direction at the fitting part 151I thereof and is fixed by welding or the like. Thereby, the outer cylinder member 14I is formed. The outer cylinder member 14I includes the pair of extension parts 27D and 28D similar to those of the fifth embodiment. In the outer cylinder member 14I, the pair of extension parts 27D and 28D have the same positional relationship with respect to the outer cylinder 17 as in the fifth embodiment. In the outer cylinder member 14I, the pair of extension parts 27D and 28D include recessed parts 41D and 43D, that is, base parts 51D and 53D, at end portions on the fitting part 151I side.

Also in the bracket 18I of the tenth embodiment, at least one of the recessed parts 41D and 43D may be provided. Also, at least one of the recessed parts 41D and 43D may be filled with a low-rigidity material having a rigidity lower than that of the bracket 18I.

Eleventh Embodiment

Next, an eleventh embodiment will be described mainly on the basis of FIG. 18, focusing on differences from the first embodiment. Also, parts common to those in the first embodiment will be denoted by the same terms and the same reference signs.

In the eleventh embodiment, an outer cylinder member 14J is used instead of the outer cylinder member 14 of the first embodiment. This outer cylinder member 14J includes a bracket 18J. The bracket 18J includes an extension part 27J and an extension part 28J.

The extension part 27J differs from the extension part 27 of the first embodiment in that the recessed parts 41 and 42 are not provided. The extension part 28J differs from the extension part 28 of the first embodiment in that the recessed parts 43 and 44 are not provided.

Figure 18:
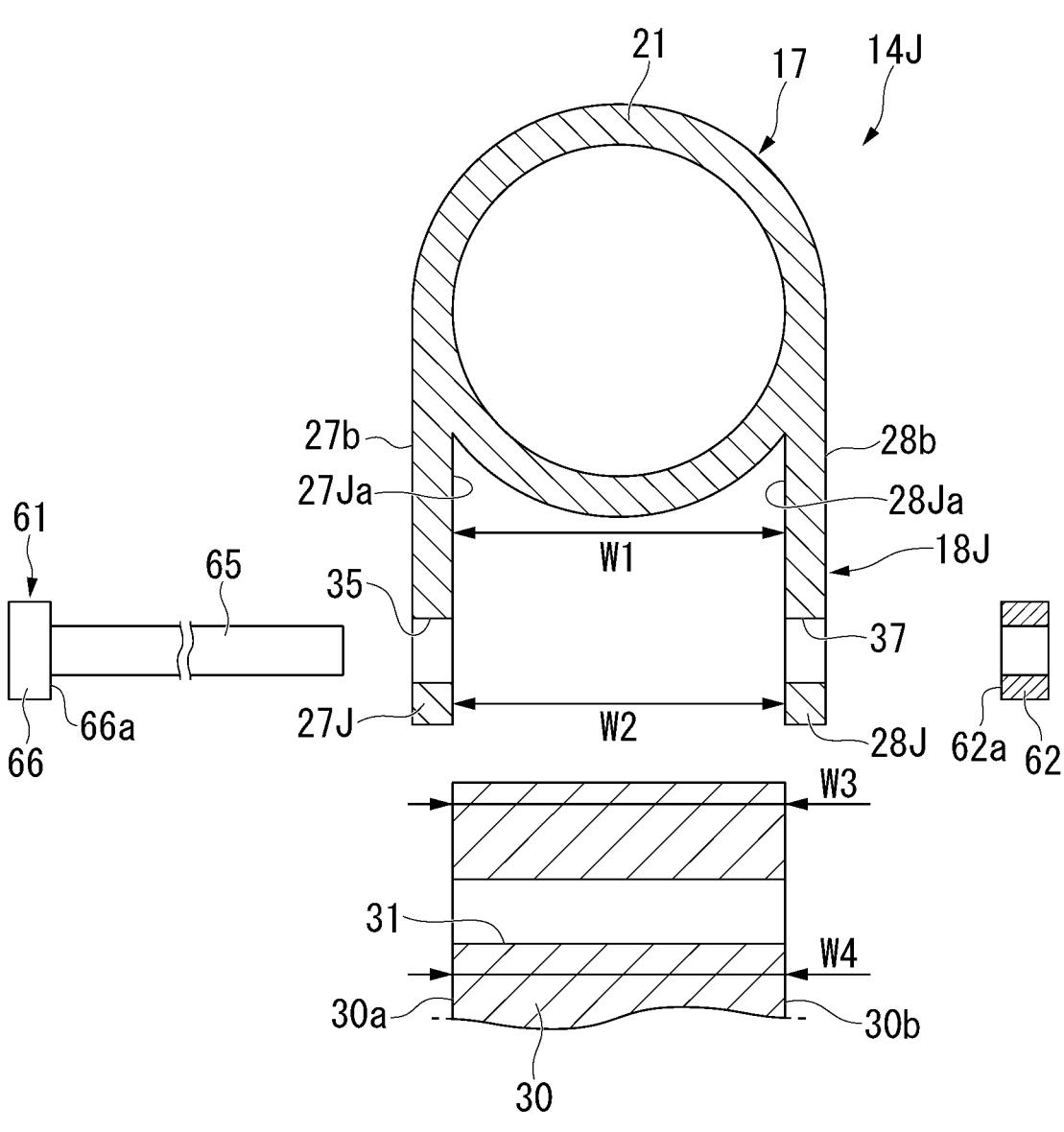
FIG. 18 is an exploded transverse sectional view illustrating an outer cylinder member and the like of a shock absorber according to an eleventh embodiment of the present invention.

Here, a length in a circumferential direction of an outer cylinder 17 between a pair of extension parts 27J and 28J on the outer cylinder 17 side of hole portions 35 to 38 (only the hole portions 35 and 37 are illustrated in FIG. 18) is referred to as W1. A length in the circumferential direction of the outer cylinder 17 between the pair of extension parts 27J and 28J on an outer side of the hole portions 35 to 38 in a radial direction of the outer cylinder 17 is referred to as W2. The lengths W1 and W2 are distances between facing surfaces 27Ja and 28Ja of the pair of extension parts 27J and 28J facing each other. In the bracket 18J, the length W2 is larger than the length W1 in a natural state before a knuckle 30 is assembled.

In the knuckle 30, a length between a pair of outer surfaces 30a and 30b in the circumferential direction of the outer cylinder 17 on the outer cylinder 17 side of attachment holes 31 and 32 (only the attachment hole 31 is illustrated in FIG. 18) is referred to as W3. A length in the circumferential direction of the outer cylinder 17 between the pair of outer surfaces 30a and 30b on an outer side of the attachment holes 31 and 32 in the radial direction of the outer cylinder 17 is referred to as W4. While the length W2 is larger than the length W1, the length W3 and the length W4 are the same as each other.

Then, in a natural state before the bracket 18J is assembled to the knuckle 30, a dimensional relationship of the lengths W1 to W4 is W1<W3=W4<W2.

Thereby, if the knuckle 30 is fitted between the pair of extension parts 27J and 28J of the bracket 18J, portions of the pair of extension parts 27J and 28J on the outer cylinder 17 side of the hole portions 35 to 38 (only the hole portions 35 and 37 are illustrated in FIG. 18) are in an interference fit relationship. On the other hand, portions of the pair of extension parts 27J and 28J on a side opposite to the outer cylinder 17 with respect to the hole portions 35 to 38 are in a clearance fit relationship.

When the portions of the pair of extension parts 27J and 28J on the outer cylinder 17 side of the hole portions 35 to 38 are in an interference fit relationship with the knuckle 30 as described above, a distance between positions of the bracket 18J and the knuckle 30 to which each of bolts 61 and 63 (only the bolt 61 is illustrated in FIG. 18) is fastened is reduced. Therefore, even if a fastening axial force of the bolts 61 and 63 and nuts 62 and 64 (only the nut 62 is illustrated in FIG. 18) is set to be small, surface pressures of seat surfaces 66a, 68a, 62a, and 64a (only the seat surfaces 66a and 62a are illustrated in FIG. 18) of the bolts 61 and 63 and the nuts 62 and 64 can be secured, and stability of fastening can be further enhanced. Thereby, further improvement in efficiency of assembling the bracket 18J to the knuckle 30 can be achieved.

In the bracket 18J, the length W2 between the pair of extension parts 27J and 28J on a side opposite to the outer cylinder 17 with respect to the hole portions 35 to 38 is larger than the length W1 between the pair of extension parts 27J and 28J on the outer cylinder 17 side of the hole portions 35 to 38. Therefore, a processing step for the facing surfaces 27Ja and 28Ja side of the pair of extension parts 27J and 28J can be reduced by utilizing a draft angle at the time of casting.

Since the length W3 and the length W4 of the knuckle 30 are the same, there is no need to change a shape of the knuckle 30 particularly, and it can be handled by changing only a shape of the bracket 18J.

Further, a dimensional relationship of the lengths W1 to W4 need only be W1<W2, and can also be W1≈W3<W2≈W4. According to such a dimensional relationship, it is necessary to change the shape of the knuckle 30, but effects other than that described above can be obtained. In addition, the knuckle 30 and the bracket 18J can be assembled without impairing the efficiency of assembly.

According to a first aspect of the present invention described above, a shock absorber includes a cylindrical inner cylinder, a relative movement member, a cylindrical outer cylinder, and a bracket having a pair of extension parts. The relative movement member is inserted into an inside of the inner cylinder from one end of the inner cylinder in an axial direction and generates a damping force by moving relative to the inner cylinder in the axial direction. The outer cylinder has an opening and into which the inner cylinder is inserted and fixed. The pair of extension parts extend outward in a radial direction of the outer cylinder from different positions spaced apart in a circumferential direction of the outer cylinder. A hole portion and a reduced-rigidity part are provided in the pair of extension parts. The hole portion is provided at a position facing an attachment hole of an attachment member disposed between the pair of extension parts. The reduced-rigidity part is disposed at a disposition position on the outer cylinder side of the hole portion at the same position as the hole portion in the axial direction of the outer cylinder. The reduced-rigidity part has a lower rigidity than a position different from the disposition position. Thereby, improvement in efficiency of assembly can be achieved.

According to a second aspect, in the first aspect, the reduced-rigidity part is a recessed part formed on a facing surface side of the pair of extension parts.

According to a third aspect, in the first aspect, the reduced-rigidity part is a recessed part formed on a non-facing surface side of the pair of extension parts.

According to a fourth aspect, in the first aspect, the reduced-rigidity part is formed of a material having a lower rigidity than a material of the pair of extension parts.

According to a fifth aspect, in the first aspect, the reduced-rigidity part is a through hole.

According to a sixth aspect, in the second or third aspect, the recessed part is formed from one end to the other end of the extension part in the axial direction of the outer cylinder.

According to a seventh aspect, in any one of the first to sixth aspects, the outer cylinder and the extension part are integrally formed of a metal shaped by heat or a force.

According to an eighth aspect, in any one of the first to seventh aspects, the bracket includes a fitting part fitted on an outer circumference of the outer cylinder, and the pair of extension parts integrally formed with the fitting part.

According to a ninth aspect, a shock absorber includes a cylindrical inner cylinder, a relative movement member, a cylindrical outer cylinder, and a bracket having a pair of extension parts. The relative movement member is inserted into an inside of the inner cylinder from one end of the inner cylinder in an axial direction and generates a damping force by moving relative to the inner cylinder in the axial direction. The outer cylinder has an opening and into which the inner cylinder is inserted and fixed. The pair of extension parts extend outward in a radial direction of the outer cylinder from different positions spaced apart in a circumferential direction of the outer cylinder. A hole portion is provided in the pair of extension parts at a position facing an attachment hole of an attachment member disposed between the pair of extension parts. A length in the circumferential direction of the outer cylinder between the pair of extension parts on an outer side of the hole portion in the radial direction of the outer cylinder is larger than a length in the circumferential direction of the outer cylinder between the pair of extension parts on the outer cylinder side of the hole portion. Thereby, improvement in efficiency of assembly can be achieved.

INDUSTRIAL APPLICABILITY

According to the shock absorber described above, improvement in efficiency of assembly can be achieved.

REFERENCE SIGNS LIST

10 Shock absorber
17 Outer cylinder
18, 18A to 18J Bracket
25 Opening
27, 27A to 27J, 28, 28A to 28J Extension part 27a, 27Ca, 28a, 28Ca Facing surface
27Ab, 27Db, 28Ab, 28Db Non-facing surface
35 to 38 Hole portion
41 to 44, 41A to 44A, 41C, 41D, 43C, 43D Recessed part (reduced-rigidity part)
41B to 44B Through hole (reduced-rigidity part)
71 Inner cylinder
90 Piston (relative movement member)
101 Rod (relative movement member)
140 Low-rigidity material
151E to 151I Fitting part

The invention claimed is:

1. A shock absorber comprising:
a cylindrical inner cylinder:
a relative movement member inserted into an inside of the inner cylinder from one end of the inner cylinder in an axial direction and configured to generate a damping force by moving relative to the inner cylinder in the axial direction;
a cylindrical outer cylinder having an opening and into which the inner cylinder is inserted and fixed; and
a bracket including
a pair of extension parts which extend outward in a radial direction of the outer cylinder from different positions spaced apart in a circumferential direction of the outer cylinder, each of the extension parts having a plurality of hole portions provided at a position facing an attachment hole of an attachment member disposed between the pair of extension parts, and
a plurality of reduced-rigidity parts provided at a disposition positions between the plurality of hole portions and the outer cylinder at the same position as the hole portions in the axial direction of the outer cylinder so as to cover a whole length of the plurality of hole portions in the axial direction, and having a lower rigidity than a position different from the disposition position.

2. The shock absorber according to claim 1, wherein the reduced-rigidity part is a recessed part formed on a facing surface side of the pair of extension parts.

3. The shock absorber according to claim 2, wherein the recessed part is formed from one end to the other end of the extension part in the axial direction of the outer cylinder.

4. The shock absorber according to claim 1, wherein the reduced-rigidity part is a recessed part formed on a non-facing surface side of the pair of extension parts.

5. The shock absorber according to claim 1, wherein the reduced-rigidity part is formed of a material having a lower rigidity than a material of the pair of extension parts.

6. The shock absorber according to claim 1, wherein the reduced-rigidity part is a through hole.

7. The shock absorber according to claim 1, wherein the outer cylinder and the extension part are integrally formed.

8. The shock absorber according to claim 1, wherein the bracket includes a fitting part fitted on an outer circumference of the outer cylinder, and the pair of extension parts integrally formed with the fitting part.

* * * * *